(12) United States Patent
Lee et al.

(10) Patent No.: US 12,054,814 B2
(45) Date of Patent: Aug. 6, 2024

(54) 3D PRINTED HYDROGEN STORAGE SYSTEMS USING NON-PYROPHORIC HYDROGEN STORAGE ALLOYS

(71) Applicant: HARNYSS IP, LLC, Fort Worth, TX (US)

(72) Inventors: Henry U. Lee, West Bloomfield, MI (US); Baoquan Huang, Troy, MI (US); Benjamin S. Chao, Troy, MI (US); Kirby Alan Smith, Fort Worth, TX (US)

(73) Assignee: HARNYSS IP, LLC, Fort Worth, TX (US)

(*) Notice: Subject to any disclaimer, the term of this patent is extended or adjusted under 35 U.S.C. 154(b) by 202 days.

(21) Appl. No.: 17/870,124

(22) Filed: Jul. 21, 2022

(65) Prior Publication Data
US 2023/0041451 A1 Feb. 9, 2023

Related U.S. Application Data

(60) Provisional application No. 63/225,389, filed on Jul. 23, 2021, provisional application No. 63/225,366, (Continued)

(51) Int. Cl.
*C22C 30/00* (2006.01)
*B22F 10/28* (2021.01)
(Continued)

(52) U.S. Cl.
CPC .............. *C22C 30/00* (2013.01); *B22F 10/28* (2021.01); *B22F 12/41* (2021.01); *F17C 1/10* (2013.01);
(Continued)

(58) Field of Classification Search
CPC .. F17C 1/14; F17C 1/10; F17C 11/005; F17C 2221/012; F17C 2203/0646;
(Continued)

(56) References Cited

U.S. PATENT DOCUMENTS 5,468,309 A 11/1995 Seri et al.
6,517,970 B2 2/2003 Ovshinsky
(Continued)

FOREIGN PATENT DOCUMENTS

CN 107208203 9/2017
EP 1206494 A1 5/2002
(Continued)

OTHER PUBLICATIONS

United States Patent & Trademark Office, International Search Report and Written Opinion for PCT/US22/37833 dated Oct. 26, 2022, 11 pages.
(Continued)

*Primary Examiner* — Robert J Hicks
(74) *Attorney, Agent, or Firm* — Daniel J. Chalker; Edwin S. Flores; Chalker Flores, LLP

(57) ABSTRACT

A hydrogen storage system includes a hydrogen storage alloy containment vessel comprising an external pressure containment vessel and a thermally conductive compartmentalization network disposed within the pressure containment vessel. The compartmentalization network creates compartments within the pressure vessel within which a hydrogen storage alloy is disposed. One or both of the compartmentalization network and the pressure vessel may be formed by a 3D printing process, such as by Selective Laser Melting (SLM) and/or Direct Metal Laser Sintering (DMLS). The hydrogen storage alloy is a non-pyrophoric $AB_2$-type Laves phase hydrogen storage alloy having: an A-site to B-site elemental ratio of not more than 0.5; and an
(Continued)

alloy composition including (in at %): Zr: 2.0-5.5, Ti: 27-31.3, V: 8.3-9.9, Cr: 20.6-30.5, Mn: 25.4-33.0, Fe: 1.0-5.9, Al: 0.1-0.4, and/or Ni: 0.0-4.0.

30 Claims, 13 Drawing Sheets

Related U.S. Application Data filed on Jul. 23, 2021, provisional application No. 63/225,399, filed on Jul. 23, 2021.

(51) Int. Cl.
| | |
|---|---|
| *B22F 12/41* | (2021.01) |
| *F17C 1/10* | (2006.01) |
| *F17C 1/14* | (2006.01) |
| *F17C 11/00* | (2006.01) |
| *B33Y 10/00* | (2015.01) |
| *B33Y 70/00* | (2020.01) |
| *B33Y 80/00* | (2015.01) |

(52) U.S. Cl.
CPC .............. *F17C 1/14* (2013.01); *F17C 11/005* (2013.01); *B33Y 10/00* (2014.12); *B33Y 70/00* (2014.12); *B33Y 80/00* (2014.12); *C22C 2202/04* (2013.01); *F17C 2201/0109* (2013.01); *F17C 2201/0119* (2013.01); *F17C 2203/0646* (2013.01); *F17C 2203/0648* (2013.01); *F17C 2209/2109* (2013.01); *F17C 2209/2181* (2013.01); *F17C 2221/012* (2013.01); *F17C 2223/035* (2013.01); *F17C 2260/05* (2013.01); *F17C 2260/053* (2013.01)

(58) Field of Classification Search
CPC ........ F17C 2203/0648; F17C 2223/035; F17C 2221/01; F17C 2201/0119; F17C 2201/0104; F17C 2209/2181; F17C 2209/2109; F17C 2260/05; F17C 2260/053; C22C 30/00; B22F 12/41; B22F 12/40; B22F 12/38; B22F 10/28; B33Y 10/00; B33Y 70/00; B33Y 80/00
USPC .............. 220/581, 560.04; 72/379.4; 206/0.6
See application file for complete search history.

(56) References Cited

U.S. PATENT DOCUMENTS

| | | | |
|---|---|---|---|
| 6,737,194 | B2 | 5/2004 | Ovshinsky |
| 2002/0029820 | A1 | 3/2002 | Ovshinsky et al. |
| 2002/0029821 | A1 | 3/2002 | Ovshinsky et al. |
| 2002/0179200 | A1* | 12/2002 | Ovshinsky .............. C22C 30/00 420/583 |
| 2003/0103861 | A1 | 6/2003 | Stetson et al. |
| 2016/0118654 | A1 | 4/2016 | Young et al. |
| 2020/0080164 | A1 | 3/2020 | Vartanov |
| 2022/0025487 | A1* | 1/2022 | Alabort Martinez ... C22C 14/00 |
| 2022/0025488 | A1* | 1/2022 | Alabort Martinez ... C22F 1/183 |

FOREIGN PATENT DOCUMENTS

| | | |
|---|---|---|
| KR | 910003129 | 2/1991 |
| TW | 531919 B | 5/2003 |
| TW | 567290 B | 12/2003 |
| TW | I258510 B | 7/2006 |
| TW | 202113097 A | 4/2021 |
| WO | 1995/011526 A1 | 4/1995 |
| WO | 2017/213988 A1 | 12/2017 |
| WO | 2019/239141 A1 | 12/2019 |
| WO | 202102233 A1 | 7/2021 |

OTHER PUBLICATIONS

Taiwan Intellectual Property Office, Examination Report dated Apr. 17, 2023 for Taiwan Appl. No. 111127537, 8 pp. with translation.

* cited by examiner

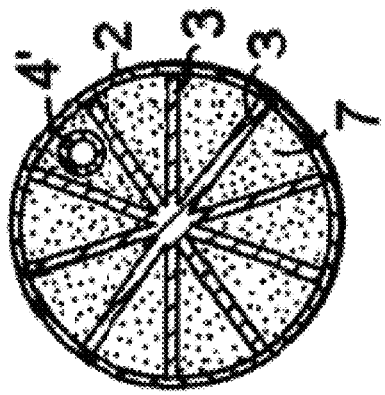
Figure 8C
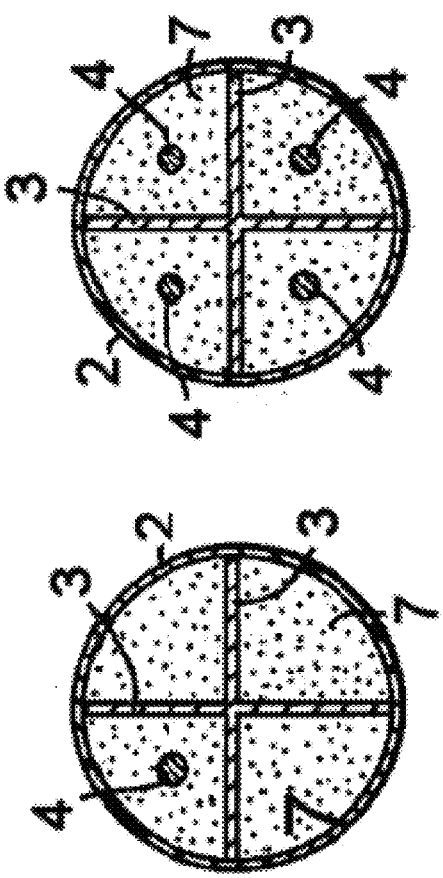
Figure 8B
Figure 8A
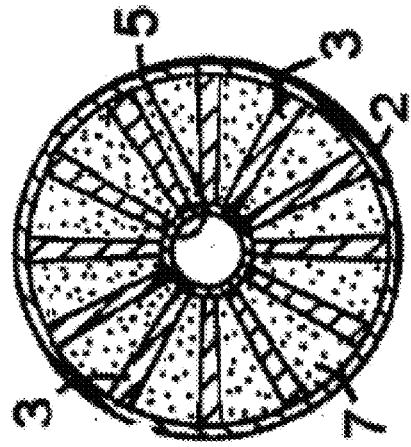
Figure 8E
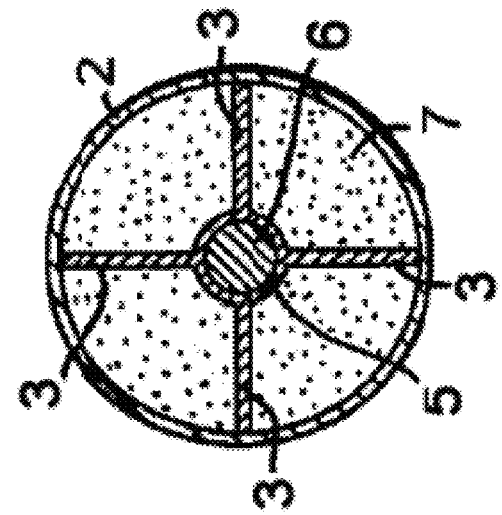
Figure 8D

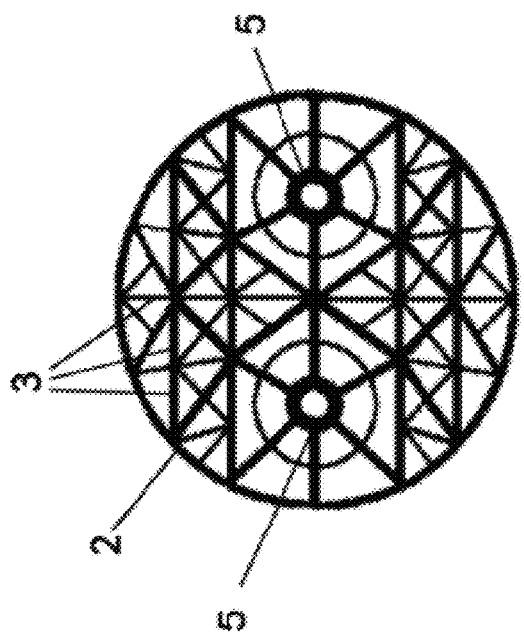
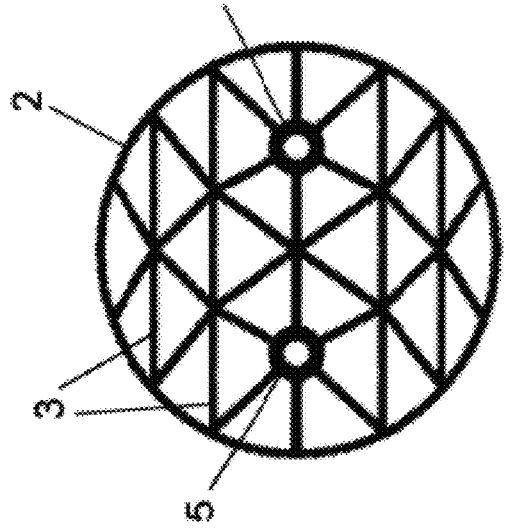
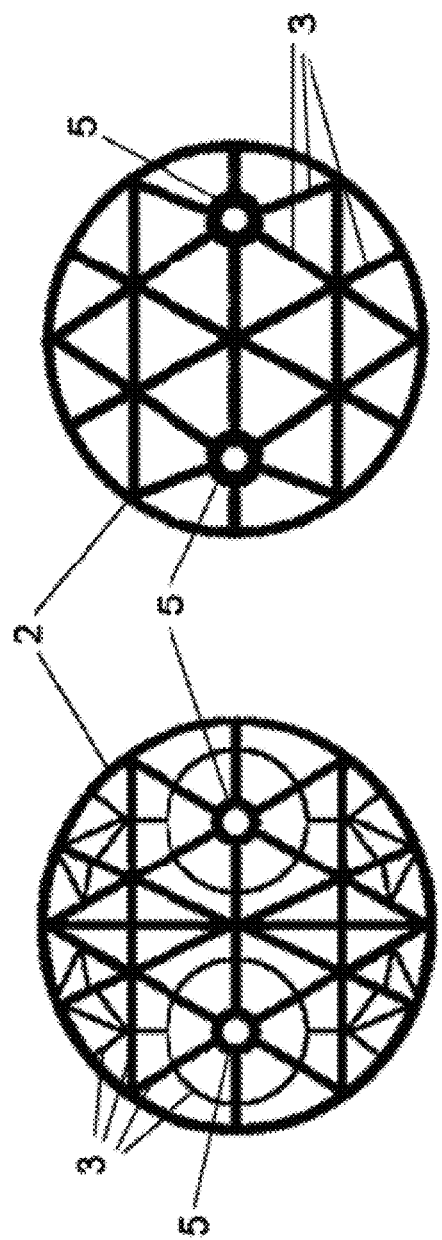
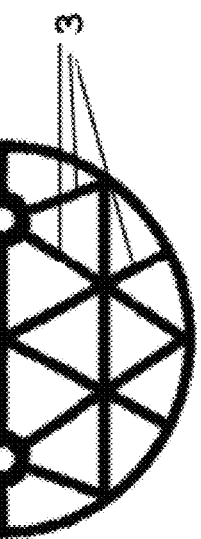

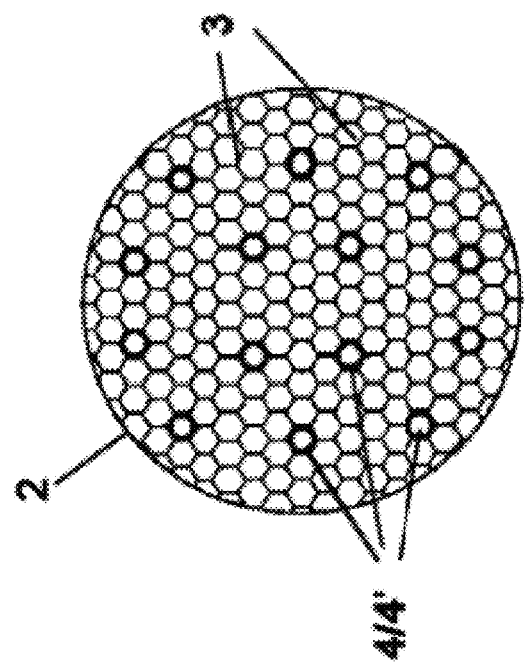
Figure 11A
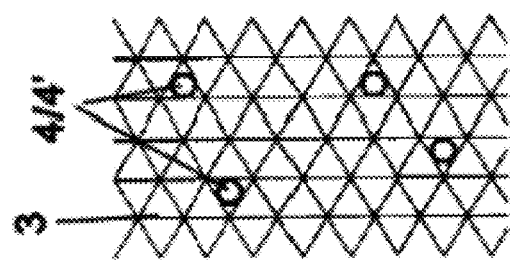
Figure 11D
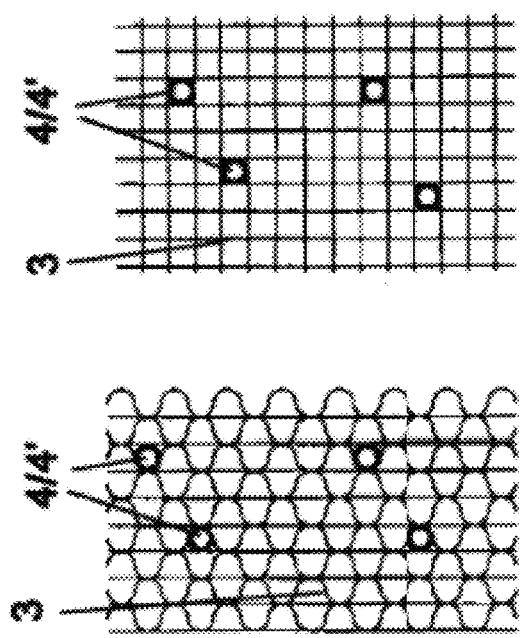
Figure 11C
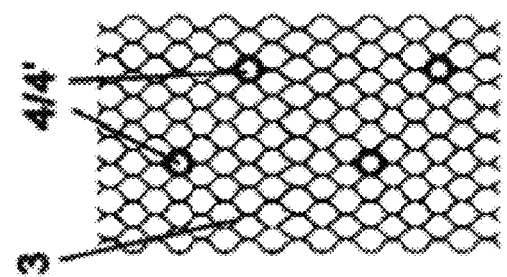
Figure 11B
Figure 11E

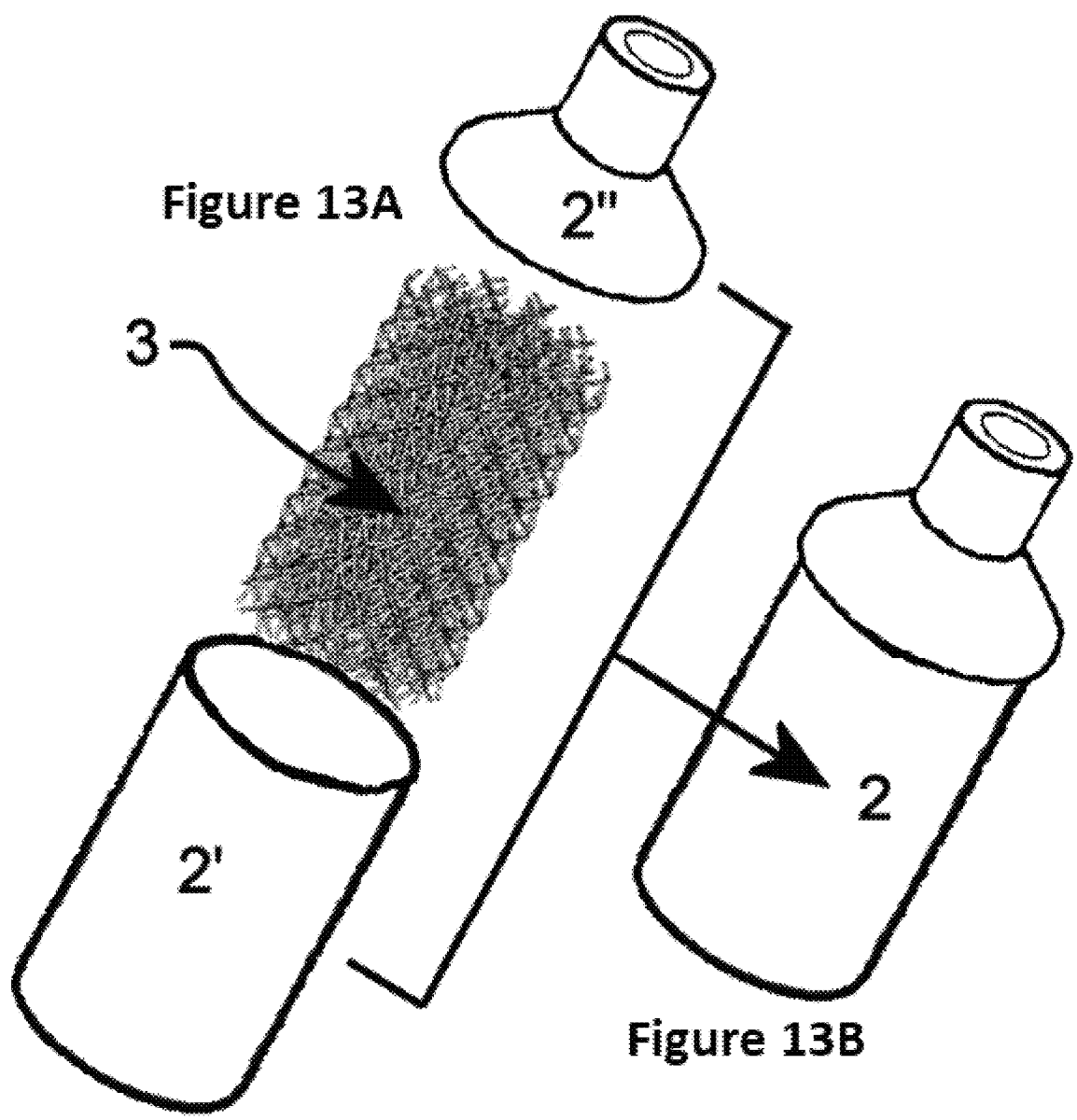

3D PRINTED HYDROGEN STORAGE SYSTEMS USING NON-PYROPHORIC HYDROGEN STORAGE ALLOYS

CROSS-REFERENCE TO RELATED APPLICATIONS

This application claims priority to: U.S. Provisional Application Ser. No. 63/225,366 filed Jul. 23, 2021 entitled "Non-Pyrophoric Hydrogen Storage Alloys and Hydrogen Storage Systems Using the Alloys"; U.S. Provisional Application Ser. No. 63/225,389 filed Jul. 23, 2021 entitled "Hydrogen Storage Systems Using Non-Pyrophoric Hydrogen Storage Alloys"; and U.S. Provisional Application Ser. No. 63/225,399 filed Jul. 23, 2021 entitled "3D Printed Hydrogen Storage Systems Using Non-Pyrophoric Hydrogen Storage Alloys". The entire contents of the foregoing applications are incorporated herein by reference.

TECHNICAL FIELD OF THE INVENTION

The present invention relates generally to 3D-printed hydrogen storage systems using non-pyrophoric $AB_2$-type Laves phase hydrogen storage alloy.

STATEMENT OF FEDERALLY FUNDED RESEARCH

Not applicable.

BACKGROUND OF THE INVENTION

Hydrogen, generally considered to be the ultimate fuel, presents numerous potential benefits to be realized as well as numerous difficulties to be overcome. With capacity to serve as a fuel for combustion engines, other processes in which heat energy is derived from combustion and used; as well as a direct source of electrochemical energy in direct conversion processes such as, for example, those used in electrochemical fuel cells, hydrogen presents opportunities for production of energy without the creation of waste products bearing disposal difficulties.

The products of hydrogen combustion, whether thermal or electrochemical, are energy and water. Neither of these is toxic, neither presents difficulties of disposal of greenhouse gases, soot, or radioactive waste. From the standpoint of being a useful, high-energy content fuel, hydrogen is an excellent candidate for most of the uses in which fossil fuels are currently used. When used for direct conversion to electrical energy in a fuel cell, hydrogen does not yield oxides of carbon which often poison catalytic material used in such electrochemical cells, nor is radioactive waste generated as is the case with electricity-supplying nuclear-powered generators.

With these tremendous benefits accruing to its use as a fuel, some burdens in the use of hydrogen as a fuel may be expected. They are present and provide challenges to overcome. The greatest difficulties with hydrogen as a fuel lie in its containment and transportation. Hydrogen may be liquefied but there is tremendous cost involved in cooling and compressing; additionally, the containment vessel cannot be completely sealed; tremendous losses are incurred through evaporation. Compression of the gas itself is costly, although not nearly so much as liquefaction, and requires stout, durable, and heavy containers. Both are inefficient forms of storage in terms of energy storage per unit volume. Other storage means would be useful.

Various metals and metal alloy compositions are available for storage of hydrogen within the metallic crystal lattice, generally as a hydride. Metal hydride systems have the advantage of storing hydrogen at high density for long periods of time because they are formed by inserting hydrogen atoms into the crystal lattice of the metal. Storage of hydrogen as a solid is appealing as enhanced volumetric efficiency is available. Such materials will generally release heat upon charging, take-up of hydrogen, absorption of hydrogen, or hydriding. Conversely, heat is necessary to release stored hydrogen from the metallic structure.

Reversible metal hydrides are a broad class of materials that undergo a reversible reaction with hydrogen. Overall reversible reaction is written as:

$$M(s) + x/2 H_2(g) \Leftrightarrow MH_x(s) + \Delta H \qquad (1)$$

where M is the hydridable alloy, $MH_x$ is the metal hydride and $\Delta H$ is the heat of formation of the metal hydride. The hydridable alloy surfaces serving to catalyze the breakup of hydrogen molecules into hydrogen atoms will be helpful prior to this reaction. The absorption reaction is exothermic, whereas the desorption reaction is endothermic. During this reaction, the metal lattice expands with the absorption of hydrogen, and the metal structure shrinks with the desorption of hydrogen, so the hydrogen storage alloy will usually have a larger effective surface area or smaller particles. When they are exposed to air, there is another possible reaction of these alloys:

$$M(s) + x/2 O_2(g) \Leftrightarrow MO_x + \Delta H \qquad (2)$$

The metal powder has a huge heat-generating reaction with oxygen, causing the surface temperature to rise significantly. High temperature causes the instability of the surface oxide layer, leading to a chain reaction between the metal powder and oxygen. This is known as pyrophoricity.

This spontaneous combustion means that the material must be specially handled by continuously providing a non-oxidative atmosphere/environment. From the perspective of distribution and improvement of hydrogen storage capacity, more importantly, the spontaneous combustion properties of these materials require special treatment during transportation. Their transportation methods are also severely restricted; usually, for example, due to their pyrophoric nature, such materials cannot usually be transported by air. Therefore, the pyrophoric nature of certain hydrogen storage alloys is one of the main safety issues related to the commercial use of hydrogen storage in the form of hydride alloys.

A series of non-pyrophoric metal hydrides are disclosed in U.S. Pat. Nos. 6,517,970 and 6,737,194 to Ovshinsky, et al., entitled "Non-pyrophoric hydrogen storage alloy". The patents state that the Ovshinsky alloys:

Generally the alloy comprises titanium, zirconium, vanadium, chromium, and manganese. The alloy may preferably further comprise iron and aluminum and may also contain 1-10 at % total of at least one element selected from the group consisting of Ba, Co, Cu, Cs, K, Li, Mm, Mo, Na, Nb, Ni, Rb, Ta, Tl, and W (where Mm is mischmetal). Specifically the low temperature hydrogen storage alloy comprises 0.5-10 at % Zr, 29-35 at % Ti, 10-15 at % V, 13-20 at % Cr, 32-38 at % Mn, 1.5-3.0 at % Fe, and 0.05-0.5 at % Al.

Unfortunately, compared with traditional metal hydrides, these prior art non-pyrophoric materials have a pressure composition temperature (PCT) curve with a relatively high slope and greater hydrogen trapping. This trapping reduces the reversible storage capacity of the alloys and creates various difficulties in practical application. New advanced materials with non-pyrophoricity, as well as high reversible capacity, low PCT curve slope (flattened plateau pressure), tailored plateau pressures and low material cost, are desired to meet the requirement of present-day hydrogen storage systems.

The ideal hydrogen storage material for large-scale commercial use must have:
1) a high storage capacity relative to the weight of the storage alloy material;
2) suitable desorption temperatures/pressures;
3) good kinetics;
4) good reversibility,
5) the ability to resist poisoning (i.e. contamination of the alloy by external impurities while cycling), including the typical pollutants present in commercial hydrogen used for cycling (e.g. oxygen and water vapor, commercial hydrogen is only 99.995% pure); and
6) a relatively low cost.

If the material is missing any of these characteristics, it will be unfeasible for large-scale commercial use.

In many applications, especially when the hydride is used in mobile applications, the hydrogen storage capacity per unit weight of material is an important consideration. Relative to the weight of the material, the low hydrogen storage capacity can, for instance, reduce the mileage and therefore the driving range of hydrogen fuel vehicles using this material. To reduce the energy required to release hydrogen, a low desorption temperature/high plateau pressure is required. Also, to effectively utilize the available waste heat from vehicles, machinery, fuel cells or other similar equipment, a relatively low desorption temperature is required to release stored hydrogen.

Therefore, there is a need in the art for hydrogen storage materials that are non-pyrophoric, have a high reversible hydrogen storage capacity, a low hydrogen desorption temperature/high plateau pressure, a relatively flat PCT isotherm curve plateau pressure, a low hysteresis, low trapping, and low materials cost.

SUMMARY OF THE INVENTION

The present invention comprises a hydrogen storage system. The hydrogen storage system may include a hydrogen storage alloy containment vessel. The hydrogen storage alloy containment vessel may include an external pressure containment vessel. The hydrogen storage alloy containment vessel may also include a thermally conductive compartmentalization network disposed within the external pressure containment vessel. The thermally conductive compartmentalization network may create compartments within the external pressure containment vessel within which a hydrogen storage alloy may be disposed.

The hydrogen storage alloy containment vessel may further include a hydrogen storage alloy disposed therein. The hydrogen storage alloy may be a non-pyrophoric $AB_2$-type Laves phase hydrogen storage alloy. The alloy may have an A-site to B-site elemental ratio of not more than about 0.5. The alloy may have an alloy composition including about (in at %): Zr: 2.0-5.5, Ti: 27-31.3, V: 8.3-9.9, Cr: 20.6-30.5, Mn: 25.4-33.0, Fe: 1.0-5.9, and Al: 0.1-0.4. More preferably, the alloy may have an alloy composition including about (in at %): Zr: 2.9-5.5, Ti: 27-30.3, V: 8.3-9.3, Cr: 20.6-26.5, Mn: 29.4-32.1, Fe: 1.5-5.9, and Al: 0.1-0.4.

The non-pyrophoric $AB_2$-type Laves phase hydrogen storage alloy may further include up to about 4 at % nickel as an equal substitute for up to about 2 at % chromium or up to about 2 at % manganese or both. The alloy may have a total hydrogen storage capacity of at least about 1.7 wt % or 1.8 wt % at about 500 psi and about 20° C. The alloy may further have a trapped hydrogen capacity of not more than about 0.25 wt % (preferably not more than about 0.2 wt % and more preferably not more than about 0.15 wt % or 0.10 wt %) at about 14.5 psi and about 20° C.

The hydrogen storage alloy may have a PCT isotherm slope of no more than about 0.8 (preferably not more than about 0.7 or 0.6). The non-pyrophoric $AB_2$-type Laves phase hydrogen storage alloy may have a hysteresis of not more than about 0.5 or 0.4 (preferably not more than about 0.3 and more preferably not more than about 0.2 or 0.1).

The alloy may also contain about 1-10 at % total of at least one element selected from the group consisting of Ba, Co, Cu, Cs, K, Li, Mm, Mo, Na, Nb, Ni, Rb, Ta, Tl, and W (where Mm is mischmetal).

One or both of the external pressure containment vessel and the thermally conductive compartmentalization network may be fabricated by 3D printing processes. Both of the external pressure containment vessel and the thermally conductive compartmentalization network may be fabricated simultaneously as a single unit by a 3D printing process.

The thermally conductive compartmentalization network may be fabricated by a 3D metal printing process, in which the highly thermally conductive printed metal is selected from the group consisting of aluminum, aluminum alloys, copper, copper alloys, magnesium and magnesium alloys. The 3D metal printing process may comprise deposition by Selective Laser Melting (SLM) and/or Direct Metal Laser Sintering (DMLS).

In addition, the present invention comprises a method of fabricating the hydrogen storage system by fabricating the thermally conductive compartmentalization network disposed within said external pressure containment vessel via a 3D printing process, and depositing the hydrogen storage alloy within said hydrogen storage alloy containment vessel.

Both the external pressure containment vessel and the thermally conductive compartmentalization network may be fabricated by the 3D printing process. Both the external pressure containment vessel and the thermally conductive compartmentalization network may be fabricated simultaneously as a single unit by the 3D printing process. The 3D printing process may comprise deposition by Selective Laser Melting (SLM) and/or Direct Metal Laser Sintering (DMLS).

The thermally conductive compartmentalization network may be fabricated by the 3D printing process, in which a highly thermally conductive printed metal is selected from the group consisting of: aluminum, aluminum alloys, copper, copper alloys, magnesium and magnesium alloys. The 3D printing process may comprise deposition by Selective Laser Melting (SLM) and/or Direct Metal Laser Sintering (DMLS).

BRIEF DESCRIPTION OF THE DRAWINGS

For a more complete understanding of the features and advantages of the present invention, reference is now made to the detailed description of the invention along with the accompanying figures and in which:

FIGS. 8A-8E depict cross sectional views of various embodiments of the hydrogen storage system of the present invention;

FIGS. 9A-9D depict cross sectional views of additional embodiments of the hydrogen storage system of the present invention;

FIGS. 11A-11E depict variants of the hexagonal matrix of FIG. 10;

FIGS. 13A-13B depict one method of producing the hydrogen storage system of the present invention.

DETAILED DESCRIPTION OF THE INVENTION

Figure 1:
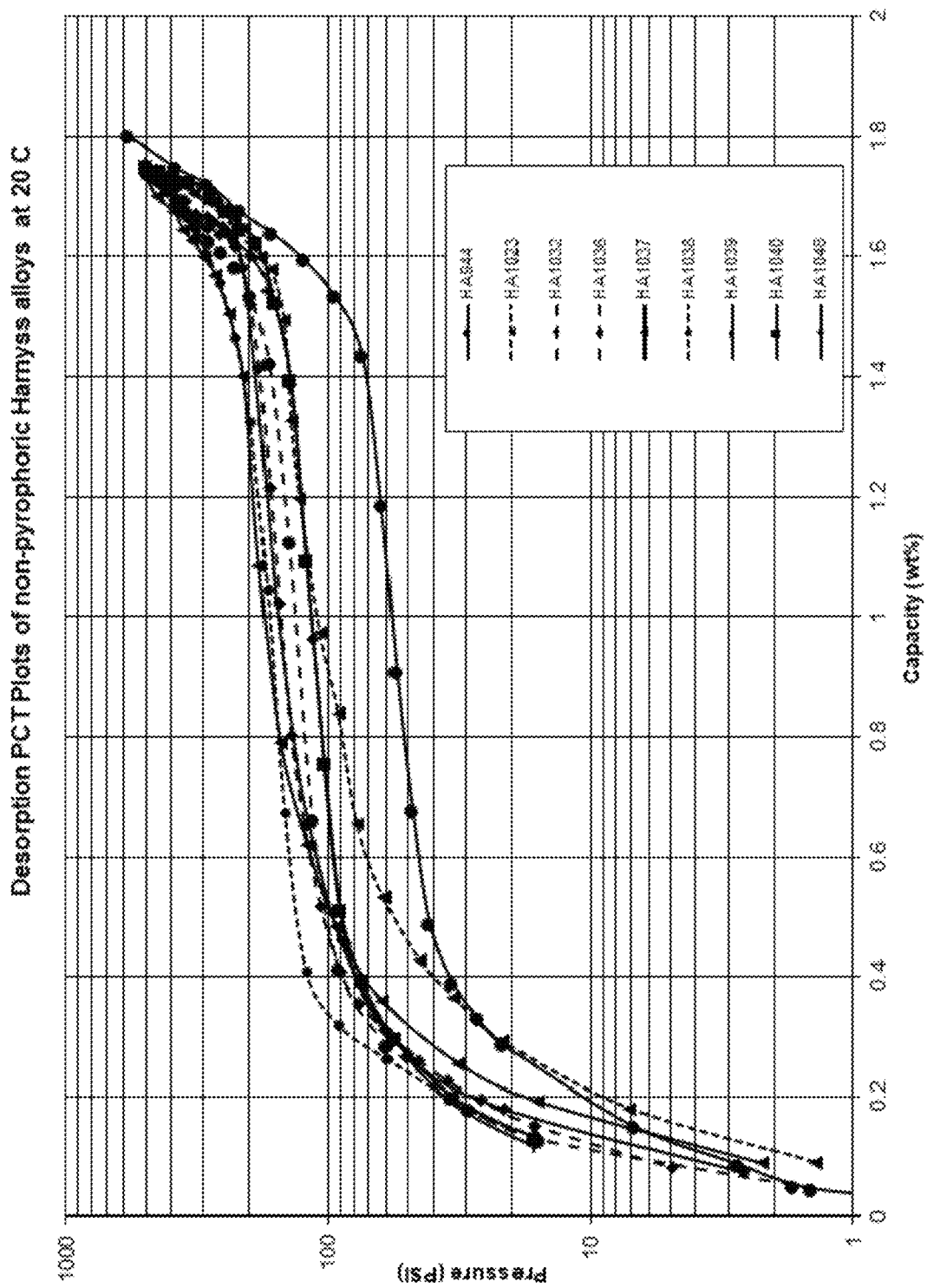
FIG. 1 displays desorption pressure composition temperature (PCT) isotherm plots for examples of the inventive non-pyrophoric hydrogen storage alloys at 20° C.

The present invention is a non-pyrophoric, $AB_2$-type Laves phase hydrogen storage alloy and hydrogen storage systems using the alloys. The alloy may preferably have an A-site to B-site elemental ratio of about <=0.5. The alloy may preferably have a total hydrogen storage capacity of at least about 1.7 wt % or 1.8% wt % at about 500 psi and about 20° C. The alloy may further have a trapped hydrogen capacity of not more than about 0.25 wt % (preferably not more than about 0.2 wt % and more preferably not more than about 0.15 wt % or 0.1 wt %) at about 14.5 psi and about 20° C.

The hydrogen storage alloy may have a pressure composition temperature (PCT) isotherm slope of no more than about 0.8 (preferably not more than about 0.7 or 0.6). The non-pyrophoric $AB_2$-type Laves phase hydrogen storage alloy may have a hysteresis of not more than about 0.5 or 0.4 (preferably not more than about 0.3 and more preferably not more than about 0.2 or 0.1).

Broadly, the inventive hydrogen storage alloy contains about (in at %): Zr: 2.0-5.5, Ti: 27-31.3, V: 8.3-9.9, Cr: 20.6-30.5, Mn: 25.4-33.0, Fe: 1.0-5.9, and Al: 0.1-0.4.

More narrowly, the inventive hydrogen storage may contain about (in at %): Zr: 2.9-5.5, Ti: 27-30.3, V: 8.3-9.3, Cr: 20.6-26.5, Mn: 26.4-32.1, Fe: 1.5-5.9, and Al: 0.1-0.4.

The alloy may also contain about 1-10 at % total of at least one element selected from the group consisting of Ba, Co, Cu, Cs, K, Li, Mm, Mo, Na, Nb, Ni, Rb, Ta, Tl, and W (where Mm is mischmetal). Low electronegativity elements (such Ba, Cs, K, Li, Na, Rb, Mm) can purify the alloy by reacting with impurity oxides, while relatively high electronegativity elements (such as Co, Cu, Mo, Nb, Ta, Tl and W) can be dissolved in $AB_2$-type Laves phase to improve hydriding properties.

The non-pyrophoric $AB_2$-type Laves phase hydrogen storage alloy may further include up to about 4 at % nickel as an equal substitute for up to about 2 at % chromium or up to about 2 at % manganese or both. Addition of nickel to the alloys can help to reduce hysteresis due to its highly catalytic nature and ductility. Nickel can also prevent the formation of body-centered cubic (BCC) secondary phase in alloys since its alloys have a higher averaging number of outer electrons.

To achieve non-pyrophoricity on exposure to ambient atmosphere, the at % of ductility-enhancing elements have been increased and the at % of brittle-enhancing elements have been decreased to reduce the inventive alloy material's decrepitation. Hydrogen embrittles metals by entering the grain boundaries and creating pressure at the weakest point. This causes micro-cracks that begin to propagate through the grain structure. This process is known as decrepitation. Decrepitation is the main reason for the loss of capacity during long cycling. Usually, high content manganese alloys are prone to decrepitation because manganese is a highly brittle element. Alternatively, vanadium, chromium or nickel containing alloys have less decrepitation issues.

Table 1 lists the compositions and properties of non-pyrophoric alloys of the present invention, two typical pyrophoric alloys and the prior art alloy of the Ovshinsky patents.

TABLE 1

| | Composition (at %) | | | | | | | A/B | | | Trapping | Capacity | Plateau |
|---|---|---|---|---|---|---|---|---|---|---|---|---|---|
| | Zr | Ti | V | Cr | Mn | Fe | Ni | Al | Ratio | Slope | Hysteresis | (wt %) | (wt %) | (psia) |
| HA944 | 5.5 | 27 | 9.3 | 20.6 | 31.2 | 5.9 | | 0.40 | 0.482 | 0.681 | 0.154 | 0.25 | 1.76 | 55 |
| HA1023 | 3.00 | 30.30 | 8.50 | 25.00 | 30.00 | 3.00 | | 0.20 | 0.499 | 0.799 | 0.067 | 0.25 | 1.74 | 95 |
| HA1032 | 2.94 | 29.70 | 8.33 | 24.50 | 31.37 | 2.94 | | 0.20 | 0.485 | 0.693 | 0.121 | 0.15 | 1.74 | 145 |
| HA1036 | 2.94 | 29.70 | 8.33 | 26.47 | 29.41 | 2.94 | | 0.20 | 0.485 | 0.550 | 0.143 | 0.13 | 1.75 | 130 |
| HA1037 | 2.94 | 29.70 | 8.33 | 24.50 | 29.41 | 2.94 | 1.98 | 0.20 | 0.485 | 0.642 | 0.042 | 0.18 | 1.73 | 165 |
| HA1038 | 3.76 | 28.63 | 8.60 | 25.06 | 29.85 | 3.89 | | 0.20 | 0.479 | 0.788 | 0.062 | 0.15 | 1.73 | 160 |
| HA1039 | 3.76 | 28.63 | 8.60 | 23.08 | 29.85 | 3.89 | 1.98 | 0.20 | 0.479 | 0.693 | 0.087 | 0.12 | 1.75 | 140 |
| HA1048 | 4.00 | 29.02 | 8.73 | 22.00 | 32.09 | 3.89 | | 0.27 | 0.493 | 0.511 | 0.262 | 0.15 | 1.74 | 115 |
| Comparative pyrophoric alloys | | | | | | | | | | | | | | |
| HA697 | 4.00 | 29.50 | 6.00 | 20.00 | 39.33 | 1.07 | | 0.10 | 0.504 | 0.588 | 0.827 | 0.09 | 1.77 | 140 |
| HA783 | 3.50 | 29.50 | 8.00 | 20.00 | 37.43 | 1.43 | | 0.14 | 0.504 | 0.588 | 0.616 | 0.11 | 1.76 | 135 |

TABLE 1-continued

| | Composition (at %) | | | | | | | A/B | | | Trapping | Capacity | Plateau |
|---|---|---|---|---|---|---|---|---|---|---|---|---|---|
| | Zr | Ti | V | Cr | Mn | Fe | Ni | Al | Ratio | Slope | Hysteresis | (wt %) | (wt %) | (psia) |
| | Previous invention alloys | | | | | | | | | | | | |
| OV555 | 1.00 | 33.00 | 12.54 | 15.00 | 36.00 | 2.25 | | 0.21 | 0.515 | 1.145 | 0.080 | 0.26 | 1.65 | 120 |

A/B ratio = A(Ti + Zr)/B(V + Cr + Mn + Fe + Al + Ni)
Slope = d ln P(psi)/d(Capacity(wt %)) at 20 C.
Hysteresis = ln Pa/ln Pd at 20 C.
Trapping (wt %) = trapping capacity at 14.5 psi and 20 C.
Capacity (wt %) = storage capacity at 500 psi and 20 C.
Plateau (psia) = desorption middle plateau pressure at 20 C.

Figure 2:
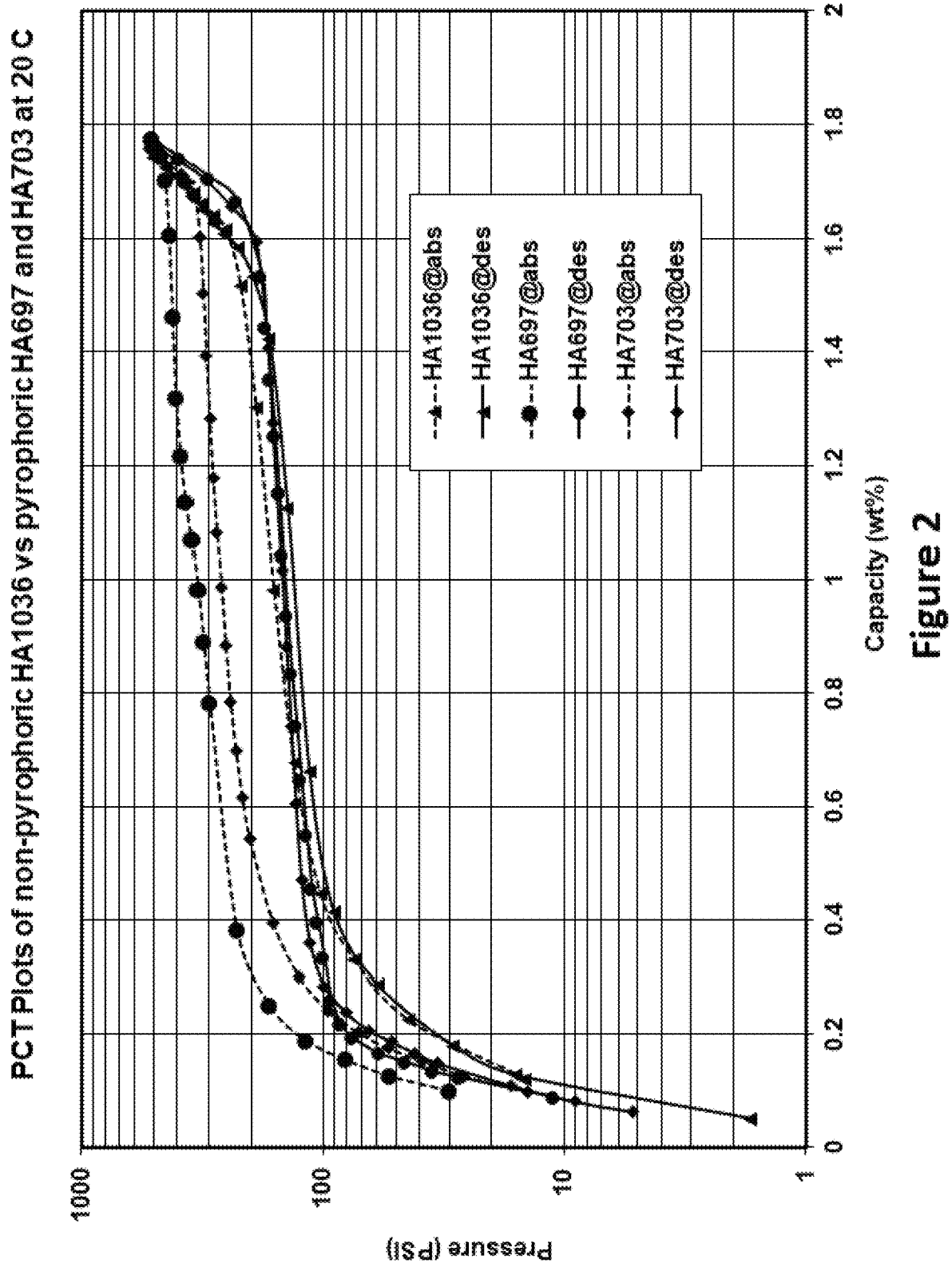
FIG. 2 displays the absorption and desorption (PCT) isotherm plots of an inventive non-pyrophoric hydrogen storage alloy vs. two comparable pyrophoric alloys at 20° C.

FIG. 1 displays desorption PCT isotherm plots for examples of the inventive non-pyrophoric hydrogen storage alloys at 20° C. Samples HA697 and HA703 in Table 1 and FIG. 2 are pyrophoric alloys with more than about 37 at % manganese. These samples are self-igniting when exposed to ambient atmosphere. Alternatively, inventive alloys such as HA1036 with higher chromium and vanadium (compared with their pyrophoric counterparts) and less manganese are non-self-igniting.

FIG. 2 displays the absorption and desorption pressure composition temperature (PCT) isotherm plots of an inventive non-pyrophoric hydrogen storage alloy (HA1036) vs. two comparable pyrophoric alloys (HA697 and HA703) at 20° C.

Another advantage of the higher content of ductility enhancing elements, such as vanadium and chromium, of the inventive hydrogen storage alloys can increase the ductility of the metal hydride alloy, which in turn, reduces hysteresis.

To understand hysteresis, it should be noted that one of the most important features of a metal hydride storage system is its plateau pressure, which indicates the pressure at which metal hydrides reversibly absorb/desorb large quantities of hydrogen. Generally, there is a difference between equivalent pressures for absorption and desorption in the pressure-composition isotherms. This differential in absorption and desorption pressure is known as hysteresis.

For example, compared with the low hysteresis (0.143) HA1036, the low vanadium and chromium HA697 and HA703 alloys have high hysteresis values of 0.827 and 0.616, respectively, as shown in FIG. 2 and Table 2.

TABLE 2

| | Composition (at %) | | | | | | | Hystersis |
|---|---|---|---|---|---|---|---|---|
| Sample # | Zr | Ti | V | Cr | Mn | Fe | Al | |
| HA697 | 4.00 | 29.50 | 6.00 | 20.00 | 39.33 | 1.07 | 0.10 | 0.827 |
| HA703 | 3.50 | 29.50 | 8.00 | 20.00 | 37.43 | 1.43 | 0.14 | 0.616 |
| HA1036 | 2.94 | 29.70 | 8.33 | 26.47 | 29.41 | 2.94 | 0.20 | 0.143 |

Hysteresis = lnPa/lnPd

The vanadium and manganese contents strongly affect the hysteresis of AB$_2$-type Laves phase hydrogen storage alloys, while the effect of the chromium is relatively weak. High vanadium content can significantly reduce the hysteresis, while high manganese content does the opposite.

Another reason why the inventive, high vanadium and chromium, hydrogen storage alloys tend not to catch fire is that V and Cr tend to form dense oxide layers that can protect the alloy from further oxidation (i.e. pyrophoric burning). Alternatively, manganese and iron form porous oxide layers that cannot protect the alloy from further contacting and reacting with oxygen.

Unfortunately, a high content of vanadium and chromium in AB$_2$-type Laves phase alloys tends to form a secondary body-centered cubic (BCC) phase. The BCC phase is a disordered structure of solid solution atoms and requires elements with similar atomic sizes and low external electrons. Generally speaking, there is a body-centered cubic phase in which the average number of external electrons is less than 5.4. Therefore, the high content of titanium, vanadium and chromium in such alloys promote the formation of the BCC phase due to their similar atomic size and lower number of external electrons.

The existence of this secondary BCC phase distorts the flatness of the plateau pressure of the PCT isotherms because the BCC phase has two hydride structures. These include a BCC phase where hydrogen atoms occupy octahedral sites and a face-centered cubic (FCC) phase where hydrogen atoms are located in tetrahedral sites. Usually, the hydrogen in large octahedral sites of the BCC hydride phase is irreversible, thereby trapping a huge amount of hydrogen, while the hydrogen in the small tetrahedral sites of the FCC phase is reversible, but plateau pressures of the FCC phase may not be the range of AB$_2$-type Laves phase alloys.

Since manganese has a larger atomic radius and a high number of external electrons, a high content of manganese can prevent the formation of a second BCC phase in the AB$_2$-type Laves phase. Therefore, the high-content manganese AB$_2$-type alloy has a relatively flat plateau pressure but has a high degree of self-ignitability and high hysteresis. In order to achieve non-ignition and low hysteresis, the manganese content in AB$_2$ alloy should not exceed about 33 at %. More preferably the manganese does not exceed about 32 at %.

Adding zirconium to the alloys can help to reduce the formation of the secondary BCC phase. This is because zirconium atoms are large and do not like to form disordered solid solution phases with titanium, vanadium and chromium. The addition of Zr to AB$_2$ alloys can result in hydrogen storage alloys having high thermal stability and low plateau pressures. This is because of zirconium's large radius and low electronegativity.

Figure 3:
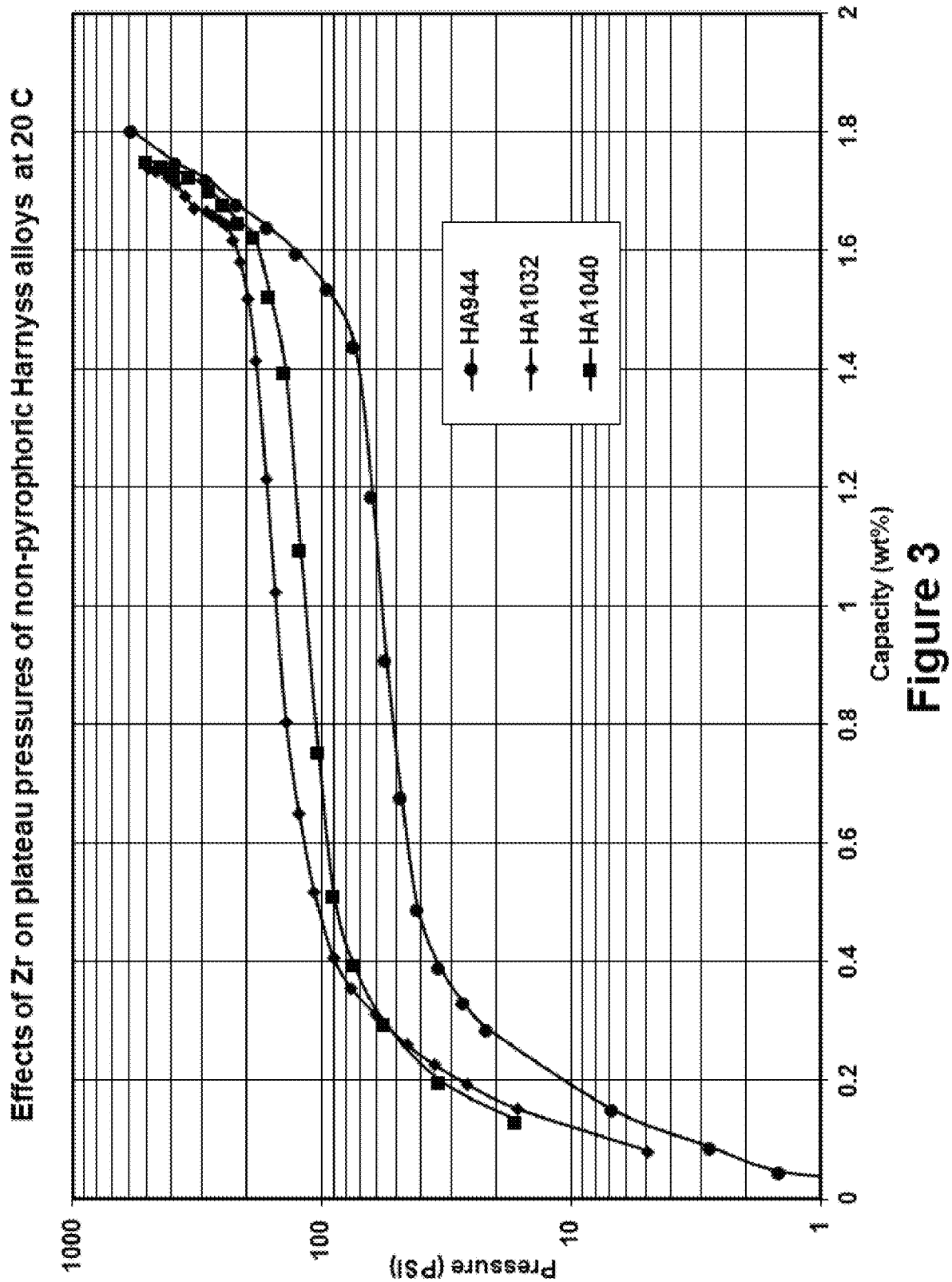
FIG. 3 displays desorption PCT isotherm plots exhibiting the effects of zirconium contents on the plateau pressures of the inventive non-pyrophoric hydrogen storage alloys at 20° C.

FIG. 3 displays desorption PCT isotherm plots exhibiting the effects of zirconium contents on the plateau pressures of the inventive non-pyrophoric hydrogen storage alloys at 20° C. This is evidenced by the difference in plateau pressure of alloys with differing Zr content. The middle plateau pressure of HA944 (with 5.5 at % Zr) is 55 psia while those of HA1040 (with 3.78 at % Zr) and HA1032 (with 2.94 at % Zr) are 110 psia and 145 psia, respectively (See Table 1).

For AB$_2$-type Laves phase alloys, the Zr/Ti ratio controls the tetrahedral interstitial sites and average electronegativity, as well as determining plateau pressures. Lower Zr/Ti values facilitate the formation of alloys with high plateau pressures while higher values result in lower plateau pressures. Thus, the plateau pressure can be, at least somewhat, tailored to the needs of the end use of the hydrogen storage alloys.

In $AB_2$-type Laves phase, the A/B ratio can affect plateau flatness. The A/B ratio has been slightly reduced to less than or equal to 0.5 to limit formation of any secondary BCC phase. This is because A-site elements, which have low outer electron numbers, favor the formation of the BCC disordered solid solution phase. Therefore, alloys that are lean in A-site elements limit the secondary phase. The existence of the secondary BCC phase can destroy the flatness of the plateau because the BCC phase has two hydride structures, that is, the BCC phase where hydrogen atoms occupy octahedral sites and the FCC phase where hydrogen atoms are located at tetrahedral sites. The hydrogen stored at the octahedral sites of the BCC hydride phase is irreversible at reasonable pressures and temperatures, thus forming hydrogen traps in the metal lattice. Although the hydrogen at tetrahedral sites of the FCC phase is reversible, the plateau pressures are not as useful as those in the $AB_2$-type Laves phase.

Figure 4:
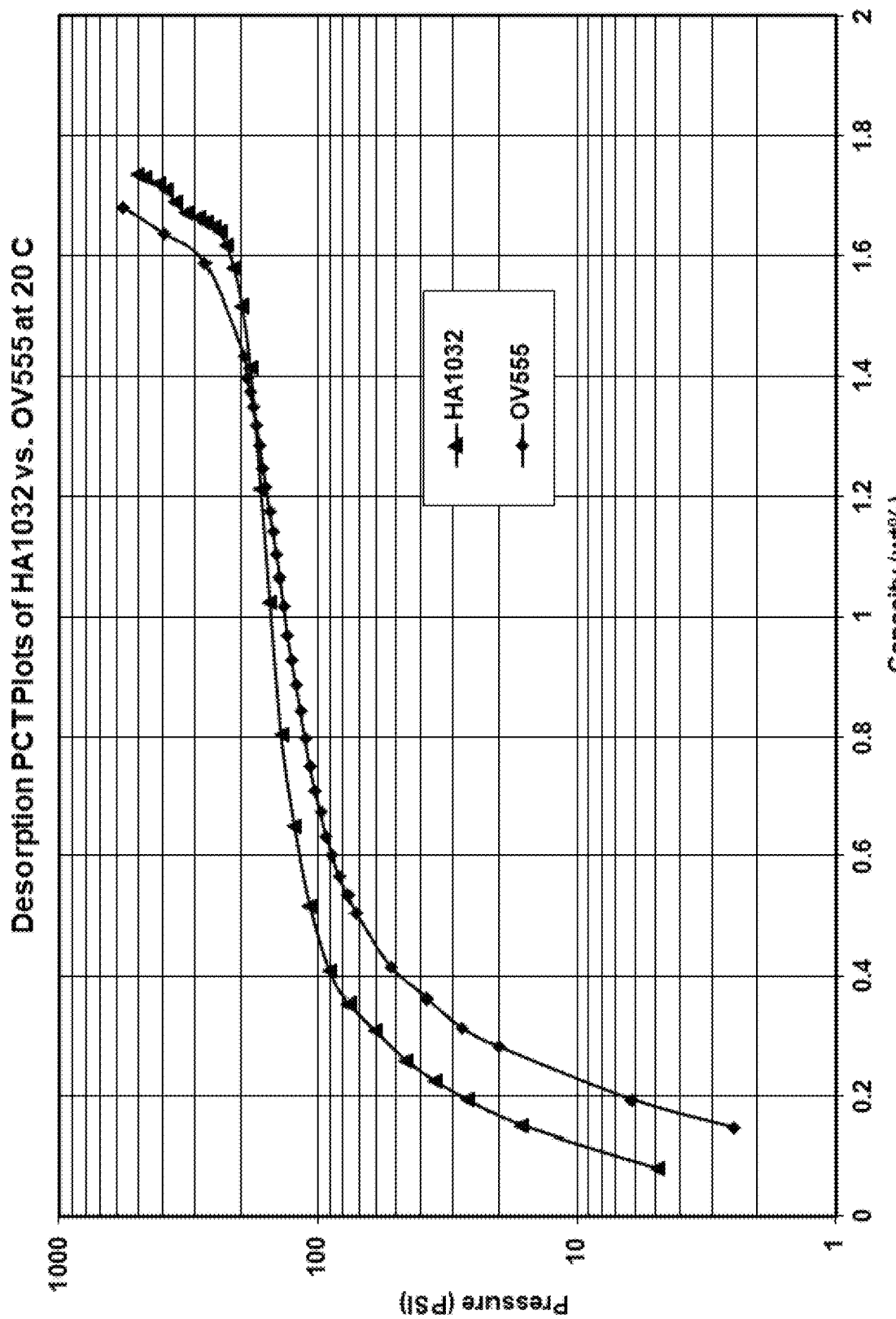
FIG. 4 displays desorption PCT isotherm plots (at 20° C.) of an A-site lean non-pyrophoric hydrogen storage alloy of the present invention vs. an A-site rich non-pyrophoric hydrogen storage alloy of the prior art Ovshinsky patents.

FIG. 4 displays desorption PCT isotherm plots (at 20° C.) of the A-site lean inventive alloy HA1032 vs. the A-site rich prior art alloy OV555. The alloy OV555 with an A/B ratio of 0.515 exhibits a high slope of 1.145 and a high trapping of 0.26 wt %, while the alloy of the present invention HA1032 with an A/B ratio of 0.485 exhibits a low slope of 0.693 and a low trapping of 0.15 wt %. This indicates that the A/B ratio significantly affects plateau pressures and plateau flatness. Thus, reduction of the A/B ratio has led to the formation of alloys with high plateau pressures as well as flatter plateaus.

While decrepitation is the main reason for the loss of capacity during long cycling and pyrophoric burning, another reason is partly related to the stresses and strains of charging/discharging cycling. High hysteresis usually exhibits high stresses and strains, thereby resulting in high decrepitation. Some elements, such as vanadium, chromium and nickel, could reduce this disadvantage in such materials.

Figure 5:
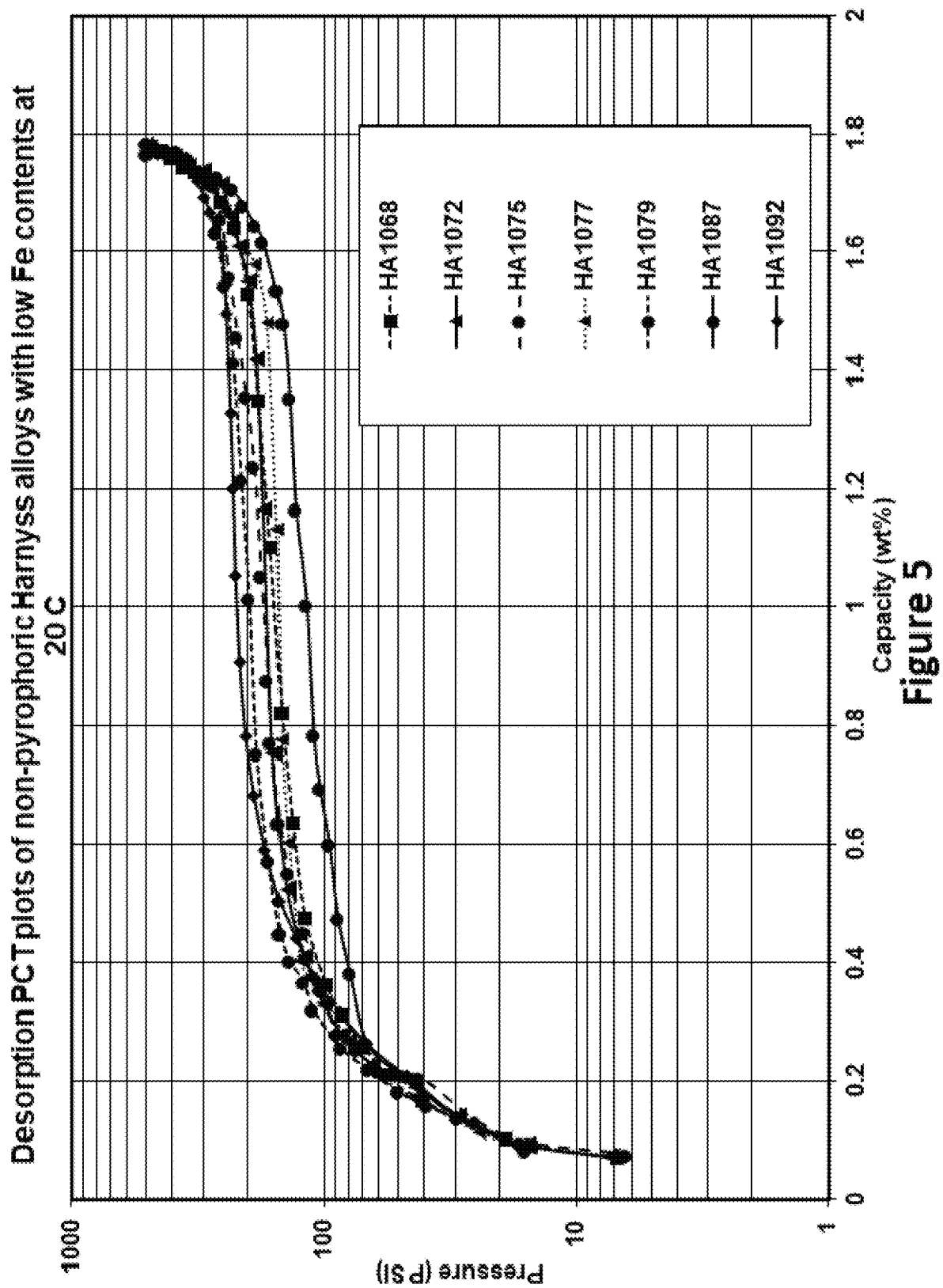
FIG. 5 displays desorption PCT isotherm plots for examples of the inventive non-pyrophoric hydrogen storage alloys with low iron contents at 20° C.

The price of pure vanadium is several times higher than ferrovanadium. Replacement of pure vanadium with low-cost ferrovanadium will significantly reduce cost of materials to produce the alloys. Typically, ferrovanadium alloy contains 15%-17% Fe and 1%-2% Al. Iron negatively affects the flammability and high hysteresis of $AB_2$-type Laves phase alloys, while aluminum negatively affects capacity and platform flatness, resulting in lower levels of both elements and better performance. Table 3 lists the compositions and properties of non-pyrophoric alloys with low Fe contents of the present invention. FIG. 5 displays desorption PCT isotherm plots for examples of the inventive non-pyrophoric hydrogen storage alloys with low Fe contents at 20° C.

TABLE 3

| | Composition (at %) | | | | | | | A/B | | | Trapping | Capacity | Plateau |
|---|---|---|---|---|---|---|---|---|---|---|---|---|---|
| | Zr | Ti | V | Cr | Mn | Fe | Ni | Al | Ratio | Slope | Hysteresis | (wt %) | (wt %) | (psia) |
| HA1068 | 3.70 | 29.10 | 8.40 | 24.10 | 31.03 | 1.52 | 2.00 | 0.15 | 0.488 | 0.667 | 0.092 | 0.10 | 1.78 | 152 |
| HA1072 | 3.50 | 29.10 | 8.40 | 24.20 | 31.13 | 1.52 | 2.00 | 0.15 | 0.484 | 0.697 | 0.108 | 0.09 | 1.77 | 157 |
| HA1075 | 3.50 | 29.10 | 8.40 | 25.33 | 32.00 | 1.52 | | 0.15 | 0.484 | 0.702 | 0.185 | 0.10 | 1.77 | 166 |
| HA1077 | 3.50 | 29.10 | 8.40 | 24.20 | 30.13 | 1.52 | 3.00 | 0.15 | 0.484 | 0.504 | 0.131 | 0.09 | 1.78 | 150 |
| HA1079 | 3.50 | 28.80 | 8.40 | 24.30 | 29.33 | 1.52 | 4.00 | 0.15 | 0.477 | 0.486 | 0.101 | 0.10 | 1.78 | 195 |
| HA1087 | 4.00 | 28.80 | 8.40 | 25.00 | 30.13 | 1.52 | 2.00 | 0.15 | 0.488 | 0.631 | 0.181 | 0.09 | 1.78 | 112 |
| HA1092 | 3.00 | 29.50 | 8.40 | 26.00 | 29.43 | 1.52 | 2.00 | 0.15 | 0.481 | 0.707 | 0.106 | 0.08 | 1.77 | 215 |

A/B ratio = A(Ti + Zr)/B(V + Cr + Mn + Fe + Al + Ni)
Slope = d ln P(psi)/d(Capacity(wt %)) at 20 C.
Hysteresis = ln Pa/ln Pd at 20 C.
Trapping (wt %) = trapping capacity at 14.5 psi and 20 C.
Capacity (wt %) = storage capacity at 500 psi and 20 C.
Plateau (psia) = desorption middle plateau pressure at 20 C.

The Zr can be about 2.0 at %, 2.1 at %, 2.2 at %, 2.3 at %, 2.4 at %, 2.5 at %, 2.6 at %, 2.7 at %, 2.8 at %, 2.9 at %, 3.0 at %, 3.1 at %, 3.2 at %, 3.3 at %, 3.4 at %, 3.5 at %, 3.6 at %, 3.7 at %, 3.8 at %, 3.9 at %, 4.0 at %, 4.1 at %, 4.2 at %, 4.3 at %, 4.4 at %, 4.5 at %, 4.6 at %, 4.7 at %, 4.8 at %, 4.9 at %, 5.0 at %, 5.1 at %, 5.2 at %, 5.3 at %, 5.4 at %, 5.5 at % or other incremental at % between.

The Ti can be about 27.0 at %, 27.1 at %, 27.2 at %, 27.3 at %, 27.4 at %, 27.5 at %, 27.6 at %, 27.7 at %, 27.8 at %, 27.9 at %, 28.0 at %, 28.1 at %, 28.2 at %, 28.3 at %, 28.4 at %, 28.5 at %, 28.6 at %, 28.7 at %, 28.8 at %, 28.9 at %, 29.0 at %, 29.1 at %, 29.2 at %, 29.3 at %, 29.4 at %, 29.5 at %, 29.6 at %, 29.7 at %, 29.8 at %, 29.9 at %, 30.0 at %, 30.1 at %, 30.2 at %, 30.3 at %, 30.4 at %, 30.5 at %, 30.6 at %, 30.7 at %, 30.8 at %, 30.9 at %, 31.0 at %, 31.1 at %, 31.2 at %, 3.3 at % or other incremental at % between.

The V can be about 8.3 at %, 8.4 at %, 8.5 at %, 8.6 at %, 8.7 at %, 8.8 at %, 8.9 at %, 9.0 at %, 9.1 at %, 9.2 at %, 9.3 at %, 9.4 at %, 9.5 at %, 9.6 at %, 9.7 at %, 9.8 at %, 9.9 at % or other incremental at % between.

The Cr can be about 20.6 at %, 20.7 at %, 20.8 at %, 20.9 at %, 21.0 at %, 21.1 at %, 21.2 at %, 21.3 at %, 21.4 at %, 21.5 at %, 21.6 at %, 21.7 at %, 21.8 at %, 21.9 at %, 22.0 at %, 22.1 at %, 22.2 at %, 22.3 at %, 22.4 at %, 22.5 at %, 22.6 at %, 22.7 at %, 22.8 at %, 22.9 at %, 23.0 at %, 23.1 at %, 23.2 at %, 23.3 at %, 23.4 at %, 23.5 at %, 23.6 at %, 23.7 at %, 23.8 at %, 23.9 at %, 24.0 at %, 24.1 at %, 24.2 at %, 24.3 at %, 24.4 at %, 24.5 at %, 24.6 at %, 24.7 at %, 24.8 at %, 24.9 at %, 25.0 at %, 25.1 at %, 25.2 at %, 25.3 at %, 25.4 at %, 25.5 at %, 25.6 at %, 25.7 at %, 25.8 at %, 25.9 at %, 26.0 at %, 26.1 at %, 26.2 at %, 26.3 at %, 26.4 at %, 26.5 at %, 26.6 at %, 26.7 at %, 26.8 at %, 26.9 at %, 27.0 at %, 27.1 at %, 27.2 at %, 27.3 at %, 27.4 at %, 27.5 at %, 27.6 at %, 27.7 at %, 27.8 at %, 27.9 at %, 28.0 at %, 28.1 at %, 28.2 at %, 28.3 at %, 28.4 at %, 28.5 at %, 28.6 at %, 28.7 at %, 28.8 at %, 28.9 at %, 29.0 at %, 29.1 at %, 29.2 at %, 29.3 at %, 29.4 at %, 29.5 at %, 29.6 at %, 29.7 at %, 29.8 at %, 29.9 at %, 30.0 at %, 30.1 at %, 30.2 at %, 30.3 at %, 30.4 at %, 30.5 at % or other incremental at % between.

The Mn can be about 25.4 at %, 25.5 at %, 25.6 at %, 25.7 at %, 25.8 at %, 25.9 at %, 26.0 at %, 26.1 at %, 26.2 at %, 26.3 at %, 26.4 at %, 26.5 at %, 26.6 at %, 26.7 at %, 26.8 at %, 26.9 at %, 27.0 at %, 27.1 at %, 27.2 at %, 27.3 at %, 27.4 at %, 27.5 at %, 27.6 at %, 27.7 at %, 27.8 at %, 27.9 at %, 28.0 at %, 28.1 at %, 28.2 at %, 28.3 at %, 28.4 at %, 28.5 at %, 28.6 at %, 28.7 at %, 28.8 at %, 28.9 at %, 29.0 at %, 29.1 at %, 29.2 at %, 29.3 at %, 29.4 at %, 29.5 at %, 29.6 at %, 29.7 at %, 29.8 at %, 29.9 at %, 30.0 at %, 30.1 at %, 30.2 at %, 30.3 at %, 30.4 at %, 30.5 at %, 30.6 at %, 30.7 at %, 30.8 at %, 30.9 at %, 31.0 at %, 31.1 at %, 31.2 at %, 31.3 at %, 31.4 at %, 31.5 at %, 31.6 at %, 31.7 at %, 31.8 at %, 31.9 at %, 32.0 at %, 32.1 at %, 32.2 at %, 32.3 at %, 32.4 at %, 32.5 at %, 32.6 at %, 32.7 at %, 32.8 at %, 32.9 at %, 33.0 at % or other incremental at % between.

The Fe can be about 1.0 at %, 1.1 at %, 1.2 at %, 1.3 at %, 1.4 at %, 1.5 at %, 1.6 at %, 1.7 at %, 1.8 at %, 1.9 at %, 2.0 at %, 2.1 at %, 2.2 at %, 2.3 at %, 2.4 at %, 2.5 at %, 2.6 at %, 2.7 at %, 2.8 at %, 2.9 at %, 3.0 at %, 3.1 at %, 3.2 at %, 3.3 at %, 3.4 at %, 3.5 at %, 3.6 at %, 3.7 at %, 3.8 at %, 3.9 at %, 4.0 at %, 4.1 at %, 4.2 at %, 4.3 at %, 4.4 at %, 4.5 at %, 4.6 at %, 4.7 at %, 4.8 at %, 4.9 at %, 5.0 at %, 5.1 at %, 5.2 at %, 5.3 at %, 5.4 at %, 5.5 at %, 5.6 at %, 5.7 at %, 5.8 at %, 5.9 at % or other incremental at % between.

The Al can be about 0.1 at %, 0.2 at %, 0.3 at %, 0.4 at % or other incremental percentage between.

The Ni can be about 0.0 at %, 0.1 at %, 0.2 at %, 0.3 at %, 0.4 at %, 0.5 at %, 0.6 at %, 0.7 at %, 0.8 at %, 0.9 at %, 1.0 at %, 1.1 at %, 1.2 at %, 1.3 at %, 1.4 at %, 1.5 at %, 1.6 at %, 1.7 at %, 1.8 at %, 1.9 at %, 2.0 at %, 2.1 at %, 2.2 at %, 2.3 at %, 2.4 at %, 2.5 at %, 2.6 at %, 2.7 at %, 2.8 at %, 2.9 at %, 3.0 at %, 3.1 at %, 3.2 at %, 3.3 at %, 3.4 at %, 3.5 at %, 3.6 at %, 3.7 at %, 3.8 at %, 3.9 at %, 4.0 at % or other incremental at % between.

The Ba, Co, Cu, Cs, K, Li, Mm, Mo, Na, Nb, Ni, Rb, Ta, Tl, and W (where Mm is mischmetal) can be about 1.0 at %, 1.1 at %, 1.2 at %, 1.3 at %, 1.4 at %, 1.5 at %, 1.6 at %, 1.7 at %, 1.8 at %, 1.9 at %, 2.0 at %, 2.1 at %, 2.2 at %, 2.3 at %, 2.4 at %, 2.5 at %, 2.6 at %, 2.7 at %, 2.8 at %, 2.9 at %, 3.0 at %, 3.1 at %, 3.2 at %, 3.3 at %, 3.4 at %, 3.5 at %, 3.6 at %, 3.7 at %, 3.8 at %, 3.9 at %, 4.0 at %, 4.1 at %, 4.2 at %, 4.3 at %, 4.4 at %, 4.5 at %, 4.6 at %, 4.7 at %, 4.8 at %, 4.9 at %, 5.0 at %, 5.1 at %, 5.2 at %, 5.3 at %, 5.4 at %, 5.5 at %, 5.6 at %, 5.7 at %, 5.8 at %, 5.9 at %, 6.0 at %, 6.1 at %, 6.2 at %, 6.3 at %, 6.4 at %, 6.5 at %, 6.6 at %, 6.7 at %, 6.8 at %, 6.9 at %, 7.0 at %, 7.1 at %, 7.2 at %, 7.3 at %, 7.4 at %, 7.5 at %, 7.6 at %, 7.7 at %, 7.8 at %, 7.9 at %, 8.0 at %, 8.1 at %, 8.2 at %, 8.3 at %, 8.4 at %, 8.5 at %, 8.6 at %, 8.7 at %, 8.8 at %, 8.9 at %, 9.0 at %, 9.1 at %, 9.2 at %, 9.3 at %, 9.4 at %, 9.5 at %, 9.6 at %, 9.7 at %, 9.8 at %, 9.9 at %, 10.0 at % or other incremental at % between.

The alloy can have a trapped hydrogen capacity (at about 14.5 psi and about 20° C.) of no more than about 0.08 wt %, 0.09 wt %, 0.10 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt % other incremental wt % between. The alloy can have a trapped hydrogen capacity (at about 14.5 psi and about 20° C.) of less than 0.08 wt %.

The alloy can have a PCT isotherm slope of no more than about 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80 or other incremental value between. The alloy can have a PCT isotherm slope of less than 0.50.

The alloy can have a hysteresis of not more than about 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50 or other incremental value between.

The alloy can have a total hydrogen storage capacity (at about 500 psi and about 20° C.) of at least about 1.70 wt %, 1.71 wt %, 1.72 wt %, 1.73 wt %, 1.74 wt %, 1.75 wt %, 1.76 wt %, 1.77 wt %, 1.78 wt %, 1.79 wt %, 1.80 wt % other incremental wt % between. The alloy can have a total hydrogen storage capacity (at about 500 psi and about 20° C.) of greater than 1.80 wt %.

Figure 6:
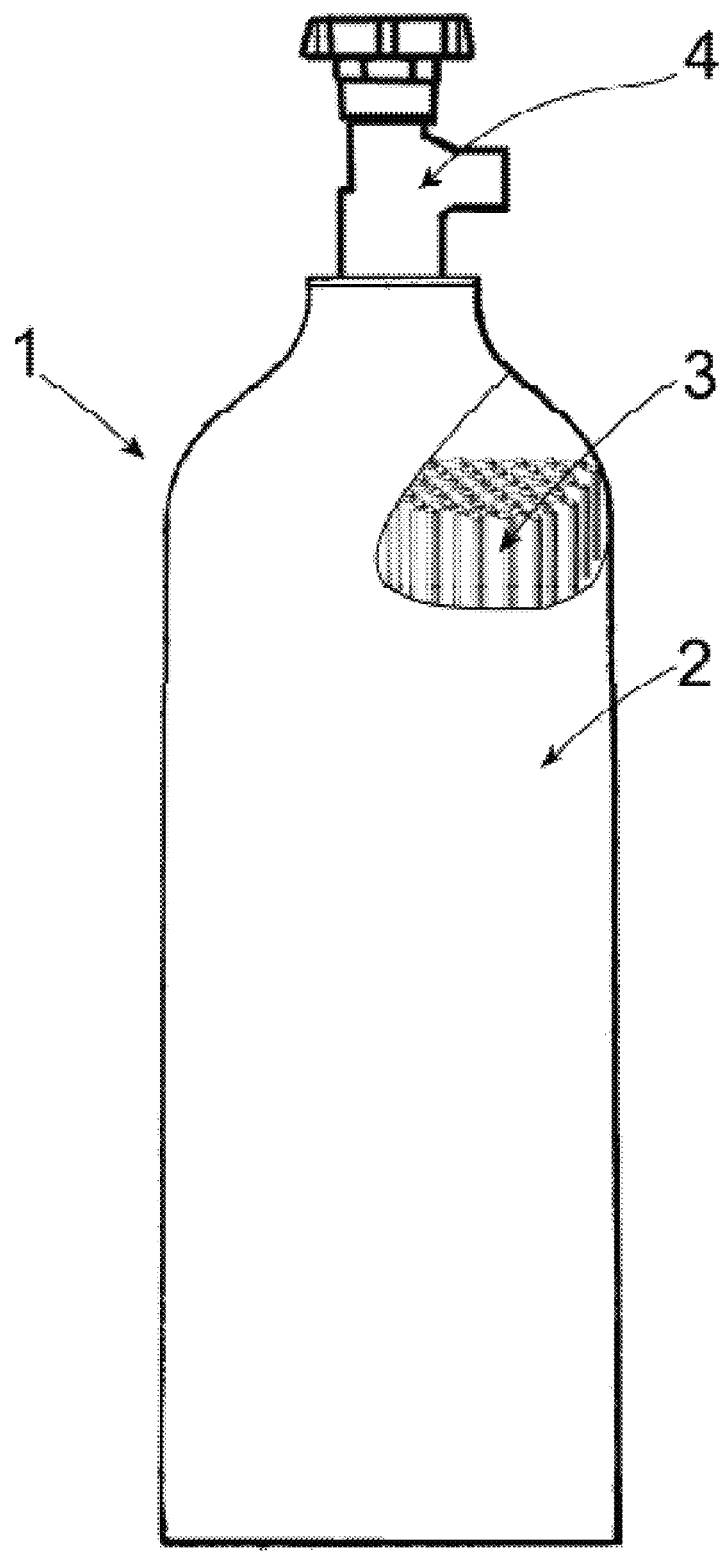
FIG. 6 depicts a hydrogen storage system according to the present invention.

The hydrogen storage system 1 of the present invention can be seen in FIG. 6. FIG. 6 depicts the hydrogen storage system 1 which includes a hydrogen storage alloy containment vessel. The hydrogen storage alloy containment vessel includes an external pressure containment vessel 2. The hydrogen storage alloy containment vessel further includes a thermally conductive compartmentalization network 3 disposed within the external pressure containment vessel 2. The thermally conductive compartmentalization network 3 creates thermally conductive compartments within the external pressure containment vessel 2. A hydrogen storage alloy 7 is disposed within the thermally conductive compartments of the thermally conductive compartmentalization network 3. Typically, a conventional pressure valve 4 is connected to the valve opening of the external pressure containment vessel 2 to control inflow and outflow of hydrogen gas from the external pressure containment vessel 2 for storage in the hydrogen storage alloy 7. Other embodiments many include different or specialized pressure valves that interface with other systems, such as other types of storage systems, vehicles, engines, equipment or any other system that uses hydrogen whether known or unknown.

It is preferable that at least the thermally conductive compartmentalization network 3 is produced by a 3D printing process. Alternatively, both the thermally conductive compartmentalization network 3 and the external pressure containment vessel 2 are produced simultaneously by a 3D printing process.

Figure 7:
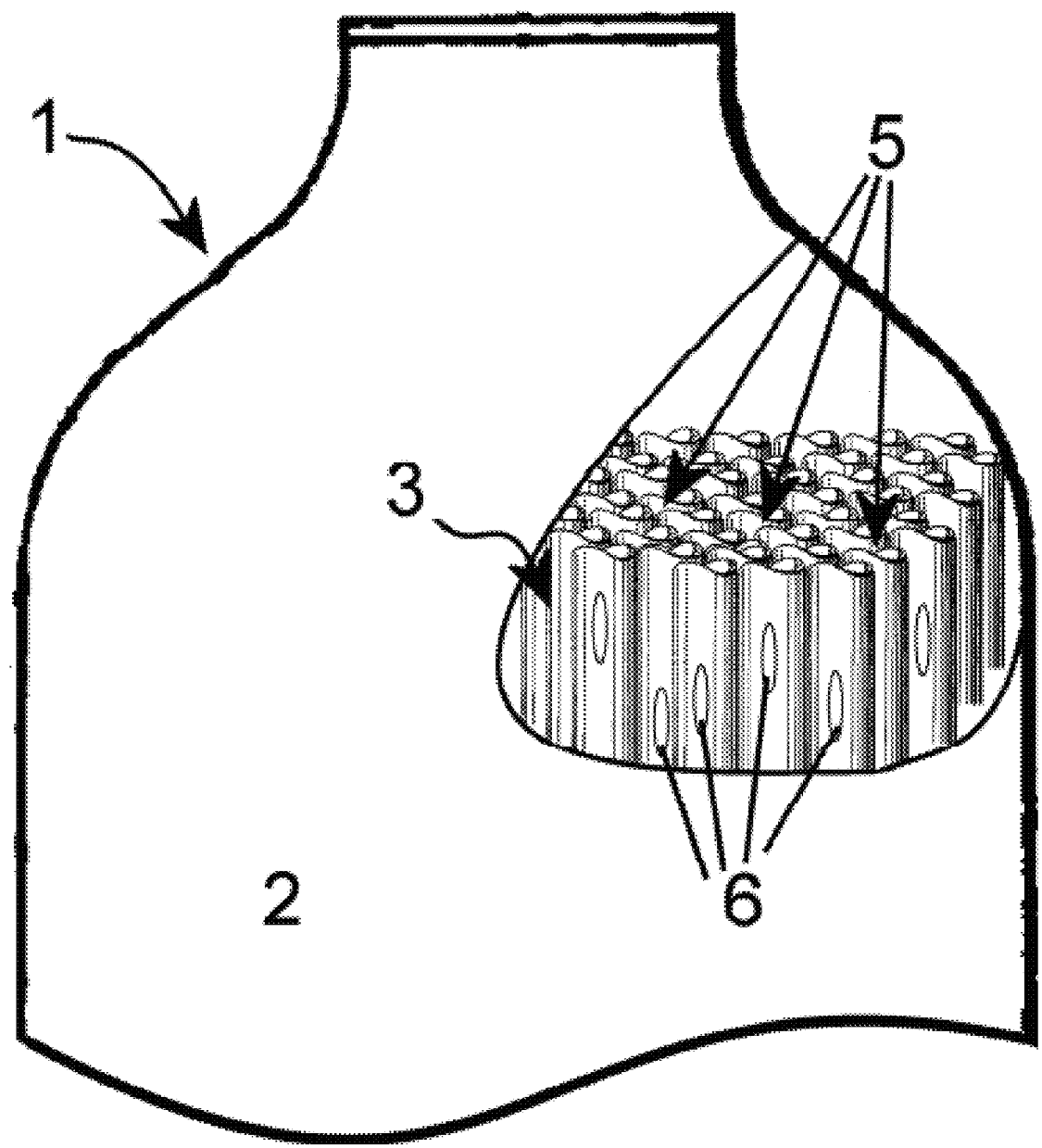
FIG. 7 depicts a magnified image of the top of the hydrogen storage system in FIG. 6.

FIG. 7 depicts a magnified image of the top of the hydrogen storage system 1. As depicted in FIG. 7, the thermally conductive compartmentalization network 3 is formed from a plurality of elongate tubes 5, which are positioned within the external pressure containment vessel 2. The plurality of elongate tubes 5 are packed into the external pressure containment vessel 2 to form a coherent, tightly packed bundle, wherein longitudinal axes of the elongate tubes 5 are parallel to a longitudinal axis of the external pressure containment vessel 2. The elongate tubes 5 are preferably thin walled and made of aluminum, copper, magnesium or alloys of these metals to avoid any problem with interaction between the elongate tubes and the hydrogen atmosphere within the external pressure containment vessel 2. The external pressure containment vessel 2 can be made of aluminum, copper, stainless steel, carbon steel, and other metals when properly designed in accordance with known technology.

The elongate tubes 2 are packed firmly into a bundle within the external pressure containment vessel 2 so that each elongate tube 5 in the bundle is in firm contact along its longitudinal surface with the longitudinal surfaces of other elongate tubes 5. In addition, the outer elongate tubes 5 in the bundle make firm contact along their longitudinal surfaces with the longitudinal inside surface of the external pressure containment vessel 2.

FIGS. 8A-8E depict cross-sectional views of different hydrogen storage systems of the present invention. The systems include external pressure containment vessels 2 containing thermally conductive compartmentalization networks 3. The hydrogen storage alloy 7 is disposed within compartments of the thermally conductive compartmentalization networks 3. In general, the thermally conductive compartmentalization network 3 divides the interior of the external pressure containment vessel 2 into at least two compartments. In FIGS. 8A, 8B and 8D, the thermally conductive compartmentalization network 3 divides the interior of the external pressure containment vessel 2 into four compartments. Alternatively, the thermally conductive compartmentalization networks 3 of the systems of FIGS. 8C and 8E divide the external pressure containment vessel 2 into a larger plurality of compartments.

The hydrogen storage system can include non-storage components 4 within the system. These non-storage components 4 may include heat transport and/or generation means, as well as gaseous transport means. Further, the non-storage components 4 may be sensors, such as, for instance thermal probes to monitor internal temperature. The non-storage components 4 may be inserted within the hydrogen storage alloy 7 as desired (see FIGS. 8A and 8B), but they may also have dedicated places 4' (see FIG. 8C) within the compartmentalization network 3 as well.

As depicted in FIGS. 8D and 8E, the thermally conductive compartmentalization network 3 may further include an internal hub area 5. This internal hub area 5 can allow for any and/or all of the functions of the non-storage components 4 in a centralized area of the thermally conductive compartmentalization network 3. This internal hub area 5 may also allow for interconnection of multiple hydrogen storage systems via connection 6.

FIGS. 9A to 9D depict additional cross-sectional views of other thermally conductive compartmentalization network 3 structures. These structures include two hub area 5 and complex compartmentalization networks 3. These types of thermally conductive compartmentalization networks 3 lend themselves to 3D printing owing to their complex nature. Particularly, simultaneously 3D printing the external pressure containment vessel 2 and the thermally conductive compartmentalization network 3 allows for stronger systems using less materials. That is, the thermally conductive compartmentalization network 3 is connected to and reinforces the external pressure containment vessel 2 such that the external pressure containment vessel 2 may contain less material and still be capable of withstanding the internal pressure required to store hydrogen within the hydrogen storage alloy. While two hubs 5 are shown in FIGS. 8A-8D, it should be noted that any number of hubs 5 may be used as needed depending on system size, thermal considerations, mechanical requirements, etc.

Figure 10:
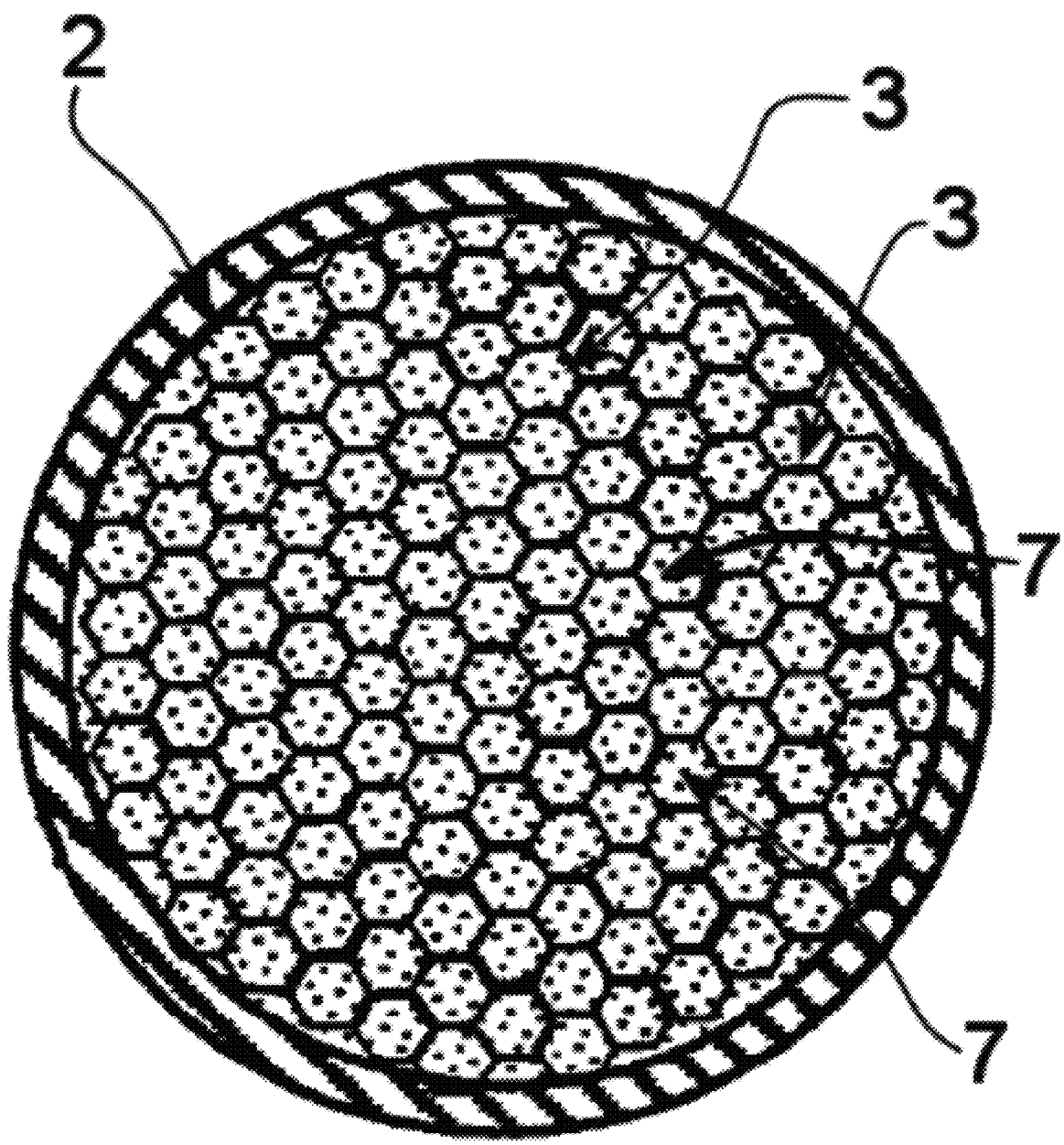
FIG. 10 depict a cross sectional view of an embodiment of the hydrogen storage system of the present invention having an elongated hexagonal matrix compartmentalization network.

FIG. 10 depicts a cross-sectional view of an embodiment of the hydrogen storage system of the present invention. The system has the external pressure containment vessel 2 and also contains a thermally conductive compartmentalization network 3 formed as an elongated hexagonal matrix. The hydrogen storage alloy 7 is disposed within the compartments of the elongated hexagonal matrix.

FIG. 11A shows the elongated hexagonal matrix of FIG. 10, while FIGS. 11B-11E depict other elongated matrix structures forming other shaped compartments within the thermally conductive compartmentalization networks 3. The thermally conductive compartmentalization networks 3 of these embodiments can include non-storage components 4/4'. As with the structures of FIGS. 9A-9D, these elongated matrix configurations are preferably formed via 3D printing.

Figure 12A:
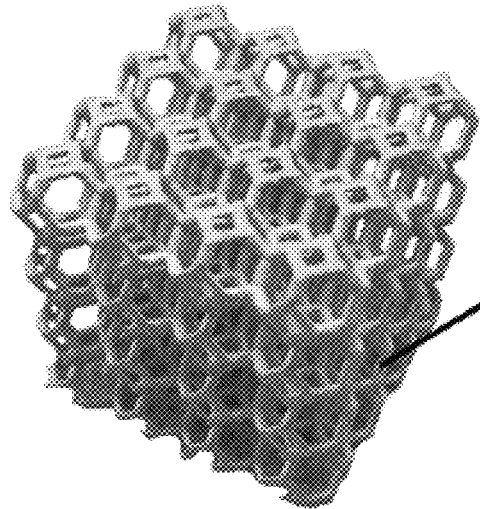
FIGS. 12A-12C depict various compartmentalization networks which may be produced via 3D printing.
Figure 12B:
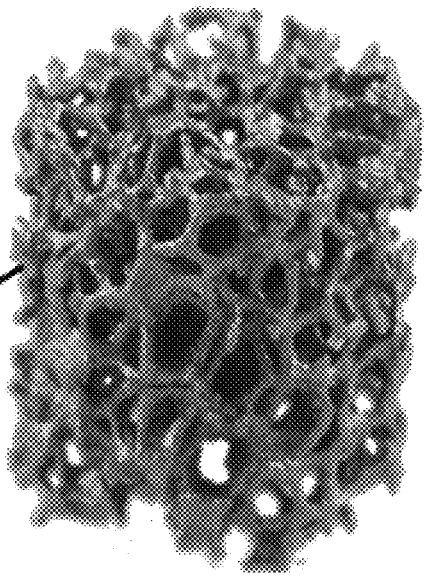
Figure 12C:
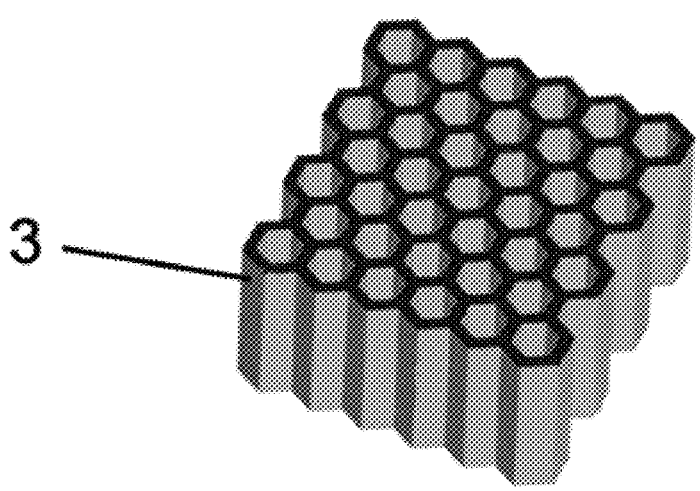

FIGS. 12A-12C depict various thermally conductive compartmentalization networks 3 which may be produced via 3D printing. FIG. 12A is a very high strength metal matrix, which may be inserted into the external pressure vessel 2. FIG. 12B is a metal foam matrix, which may also be inserted into the external pressure vessel 2. Finally, FIG. 12C depicts an elongated hexagonal matrix such as that depicted in FIGS. 10 and 11A.

FIGS. 13A and 13B depict one method of producing the hydrogen storage system 1 of the present invention. That is, as can be seen from FIG. 13A, the external pressure containment vessel 2 can be comprised of a plurality of pressure vessel sections (i.e. 2' and 2"). The plurality of sections allows for the external creation of the thermally conductive compartmentalization network 3 and insertion thereof into one or more of the external pressure containment vessel's sections. As shown in FIG. 13B, once the thermally conductive compartmentalization network 3 is inserted, the plurality of external pressure containment vessel sections is united to enclose the thermally conductive compartmentalization network 3. The external pressure containment vessel sections may be united by techniques such as welding, brazing, friction welding, mechanically threading together, or other such techniques as may create an acceptable external pressure containment vessel 2.

Another technique for forming the hydrogen storage system 1 of the present invention is to insert an externally created thermally conductive compartmentalization network 3 into a proto-pressure vessel. Once the thermally conductive compartmentalization network 3 is inserted, the proto-pressure vessel is mechanically worked to form the final external pressure containment vessel 2, which encases the thermally conductive compartmentalization network 3.

Alternatively, the entire hydrogen storage system 1, including the external pressure containment vessel 2 and the thermally conductive compartmentalization network 3, can be formed simultaneously via 3D printing technology. This usually includes methods of 3D printing of metal.

Metal 3D printing is a catchall term for several technology families. Simply put, metal 3D printing refers to any technology that creates metal objects layer by layer through sintering, melting, and welding with metal.

Metal 3D printing is one of the most heavily invested in and fastest-growing manufacturing technologies. It can be used in conjunction with other manufacturing technologies, but it is also capable of producing prototypes and finished products on its own. In some cases, 3D-printed metal objects perform just as well as machined parts. It can be in prototyping, aerospace, mechanical engineering, specific tools, and other applications.

Aluminum is a lightweight alloy with high flexibility, good strength, and superior thermal properties and it has become the primary metal used in 3D printing. Aluminum 3D printers have been used in biomedical, automotive, and aerospace applications. Aluminum's core strength is its ability to be molded and used for functional objects as well as prototypes. The material is suitable for both prototyping and manufacturing. The quality of 3D-printed aluminum parts is comparable to that of synthetic parts. Aluminum's material properties make it an excellent choice for high-performance functional parts that are subjected to high loads.

Available 3D printing technologies include, but are not limited to:
1. Fused Deposition Modeling (FDM)
2. Stereolithography (SLA)
3. Digital Light Processing (DLP)

4. Selective Laser Sintering (SLS)
5. Material Jetting (MJ)
6. Drop on Demand (DoD)
7. Sand Binder Jetting
8. Metal Binder Jetting
9. Direct Metal Laser Sintering (DMLS) and Selective Laser Melting (SLM); and
10. Electron Beam Melting (EBM).

Of these, DMSL/SLM can be considered a useful technique for forming the entire hydrogen storage system 1.

Selective Laser Melting (SLM) and Direct Metal Laser Sintering (DMLS) are two metal additive manufacturing processes that use metal powder bed fusion, the process where a heat source is utilized to fuse metal particles one layer at a time. Both make objects in a way similar to SLS, the main difference being these technologies are used in the production of metal parts instead of plastic. Typical materials used are metal powder, aluminum, stainless steel, and titanium.

DMLS is used for producing parts from metal alloys. Instead of melting it, DMLS heats the metal powder with a laser to the point where it fuses together on a molecular level. SLM uses the laser to fully melt the metal powder to form a homogeneous part, in other words, it makes parts from single element materials, such as titanium.

DMLS and SLM processes do need structural support in order to limit the possibility of distortion, which can result from the high temperatures used during printing. The two technologies have a lot of similarities: both use a laser to scan and selectively fuse (or melt) metal powder particles, bonding them together and building a part layer-by-layer. Also, the materials used in both processes are metals that come in a granular/powder form.

The differences between SLM and DMLS come down to the fundamentals of the particle bonding process. SLM uses metal powders with a single melting temperature and fully melts the particles, while in DMLS the powder is composed of materials with variable melting points that fuse on a molecular level at elevated temperatures. Essentially, SLM produces parts from a single metal, while DMLS produces parts from metal alloys.

Both SLM and DMLS are used in industrial applications to create end-use engineering products. Using such technologies, the entire hydrogen storage system 1, including the external pressure containment vessel 2 and the thermally conductive compartmentalization network 3 can be formed simultaneously.

Using SLM and/or DMLS, the hydrogen storage system 1 of the present invention can be formed layer by layer such that both the external pressure containment vessel 2 and the thermally conductive compartmentalization network 3 are simultaneously formed bit by bit. This can involve use of a single material for the entire hydrogen storage system 1. However, the external pressure containment vessel 2 and the thermally conductive compartmentalization network 3 may also be formed of different materials using the same techniques. Metal alloys that are useful for the thermally conductive compartmentalization network 3 are highly thermally conductive alloys. These include metals such as: aluminum and aluminum alloys; copper and copper alloys; magnesium and magnesium alloys. The external pressure containment vessel 2 may be formed of those materials from which conventional pressure containers are made. These include aluminum, aluminum alloys, and steels (i.e. carbon and stainless).

In addition, the present invention comprises a method of fabricating the hydrogen storage system by fabricating the thermally conductive compartmentalization network disposed within said external pressure containment vessel via a 3D printing process, and depositing the hydrogen storage alloy within said hydrogen storage alloy containment vessel.

Both the external pressure containment vessel and the thermally conductive compartmentalization network may be fabricated by the 3D printing process. Both the external pressure containment vessel and the thermally conductive compartmentalization network may be fabricated simultaneously as a single unit by the 3D printing process. The 3D printing process may comprise deposition by Selective Laser Melting (SLM) and/or Direct Metal Laser Sintering (DMLS).

The thermally conductive compartmentalization network may be fabricated by the 3D printing process, in which a highly thermally conductive printed metal is selected from the group consisting of: aluminum, aluminum alloys, copper, copper alloys, magnesium and magnesium alloys. The 3D printing process may comprise deposition by Selective Laser Melting (SLM) and/or Direct Metal Laser Sintering (DMLS).

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patent applications and patents mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A hydrogen storage system comprising:
a hydrogen storage alloy containment vessel, wherein said hydrogen storage alloy containment vessel comprises:
an external pressure containment vessel;
a thermally conductive compartmentalization network disposed within said external pressure containment vessel, said thermally conductive compartmentalization network creating compartments within said pressure vessel within which a hydrogen storage alloy is disposed;
said hydrogen storage alloy disposed within said hydrogen storage alloy containment vessel, wherein said hydrogen storage alloy comprises a non-pyrophoric $AB_2$ Laves phase hydrogen storage alloy comprising:
an A-site to B-site elemental ratio of not more than about 0.5; and
an alloy composition including about (in at %): Zr: 2.0-5.5, Ti: 27-31.3, V: 8.3-9.9, Cr: 20.6-30.5, Mn: 25.4-33.0, Fe: 1.0-5.9, and Al: 0.1-0.4.

2. The hydrogen storage system of claim 1, wherein said alloy composition includes (in at %): Zr: 2.9-5.5, Ti: 27-30.3, V: 8.3-9.3, Cr: 20.6-26.5, Mn: 29.4-32.1, Fe: 1.5-5.9, and Al: 0.1-0.4.

3. The hydrogen storage system of claim 1, wherein said alloy composition further includes up to about 4 at % nickel as an equal substitute for up to about 2 at % chromium or up to about 2 at % manganese or both.

4. The hydrogen storage system of claim 1, wherein said alloy has a total hydrogen storage capacity of at least about 1.7 wt % at about 500 psi and about 20° C.

5. The hydrogen storage system of claim 1, wherein said alloy has a total hydrogen storage capacity of at least about 1.8 wt % at about 500 psi and about 20° C.

6. The hydrogen storage system of claim 1, wherein said alloy has a trapped hydrogen capacity of no more than about 0.25 wt % at about 14.5 psi and about 20° C.

7. The hydrogen storage system of claim 1, wherein said alloy has a trapped hydrogen capacity of no more than about 0.20 wt % at about 14.5 psi and about 20° C.

8. The hydrogen storage system of claim 1, wherein said alloy has a trapped hydrogen capacity of no more than about 0.15 wt % at about 14.5 psi and about 20° C.

9. The hydrogen storage system of claim 1, wherein said alloy has a trapped hydrogen capacity of no more than about 0.10 wt % at about 14.5 psi and about 20° C.

10. The hydrogen storage system of claim 1, wherein said alloy has a pressure composition temperature (PCT) isotherm slope of no more than about 0.8.

11. The hydrogen storage system of claim 1, wherein said alloy has a PCT isotherm slope of no more than about 0.7.

12. The hydrogen storage system of claim 1, wherein said alloy has a PCT isotherm slope of no more than about 0.6.

13. The hydrogen storage system of claim 1, wherein said alloy has a hysteresis of not more than about 0.5.

14. The hydrogen storage system of claim 1, wherein said alloy has a hysteresis of not more than about 0.4.

15. The hydrogen storage system of claim 1, wherein said alloy has a hysteresis of not more than about 0.3.

16. The hydrogen storage system of claim 1, wherein said alloy has a hysteresis of not more than about 0.2.

17. The hydrogen storage system of claim 1, wherein said alloy has a hysteresis of not more than about 0.1.

18. The hydrogen storage system of claim 1, wherein in said alloy composition further comprises about 1.0-10.0 at % total of at least one element selected from the group consisting of Ba, Co, Cu, Cs, K, Li, Mm, Mo, Na, Nb, Ni, Rb, Ta, Tl, and W (where Mm is mischmetal).

19. The hydrogen storage system of claim 1, wherein said thermally conductive compartmentalization network is fabricated by a 3D printing process.

20. The hydrogen storage system of claim 1, wherein both said external pressure containment vessel and said thermally conductive compartmentalization network are fabricated by a 3D printing process.

21. The hydrogen storage system of claim 1, wherein both said external pressure containment vessel and said thermally conductive compartmentalization network are fabricated simultaneously as a single unit by a 3D printing process.

22. The hydrogen storage system of claim 21, wherein said 3D printing process comprises deposition by Selective Laser Melting (SLM) and/or Direct Metal Laser Sintering (DMLS).

23. The hydrogen storage system of claim 1, wherein said thermally conductive compartmentalization network is fabricated by a 3D metal printing process, in which a highly thermally conductive printed metal is selected from the group consisting of: aluminum, aluminum alloys, copper, copper alloys, magnesium and magnesium alloys.

24. The hydrogen storage system of claim 23, wherein said 3D metal printing process comprises deposition by Selective Laser Melting (SLM) and/or Direct Metal Laser Sintering (DMLS).

25. A method of fabricating said hydrogen storage system of claim 1, comprising:
fabricating said thermally conductive compartmentalization network disposed within said external pressure containment vessel via a 3D printing process; and
depositing said hydrogen storage alloy within said hydrogen storage alloy containment vessel.

26. The method of claim 25, further comprising fabricating both said external pressure containment vessel said 3D printing process.

27. The method of claim 25, wherein both said external pressure containment vessel and said thermally conductive compartmentalization network are fabricated simultaneously as a single unit by said 3D printing process.

28. The method of claim 26, wherein said 3D printing process comprises deposition by Selective Laser Melting (SLM) and/or Direct Metal Laser Sintering (DMLS).

29. The method of claim 25, further comprising fabricating said thermally conductive compartmentalization network by said 3D metal printing process, in which a highly thermally conductive printed metal is selected from the group consisting of: aluminum, aluminum alloys, copper, copper alloys, magnesium and magnesium alloys.

30. The method of claim 29, wherein said 3D printing process comprises deposition by Selective Laser Melting (SLM) and/or Direct Metal Laser Sintering (DMLS).

\* \* \* \* \*